US012323253B2

(12) United States Patent
Nammi

(10) Patent No.: US 12,323,253 B2
(45) Date of Patent: Jun. 3, 2025

(54) HYBRID AUTOMATIC REPEAT REQUEST RELIABILITY FOR 5G OR OTHER NEXT GENERATION NETWORK

(71) Applicant: AT&T Intellectual Property I, L.P., Atlanta, GA (US)

(72) Inventor: SaiRamesh Nammi, Austin, TX (US)

(73) Assignee: AT&T Intellectual Property I, L.P., Atlanta, GA (US)

(*) Notice: Subject to any disclaimer, the term of this patent is extended or adjusted under 35 U.S.C. 154(b) by 688 days.

(21) Appl. No.: 17/333,918

(22) Filed: May 28, 2021

(65) Prior Publication Data

US 2021/0297187 A1    Sep. 23, 2021

Related U.S. Application Data

(63) Continuation of application No. 16/357,733, filed on Mar. 19, 2019, now Pat. No. 11,038,626.

(Continued)

(51) Int. Cl.
*H04L 1/18*         (2023.01)
*H04B 7/0417*       (2017.01)
(Continued)

(52) U.S. Cl.
CPC ......... *H04L 1/1812* (2013.01); *H04B 7/0417* (2013.01); *H04L 1/0026* (2013.01); *H04L 1/1861* (2013.01); *H04W 72/20* (2023.01)

(58) Field of Classification Search
CPC ... H04L 1/1812; H04L 1/1893; H04L 5/0055; H04L 5/0057; H04L 1/0026;
(Continued)

(56) References Cited

U.S. PATENT DOCUMENTS 9,621,323 B2    4/2017  Han et al.
2016/0211962 A1* 7/2016  Lee ..................... H04W 72/23
(Continued)

FOREIGN PATENT DOCUMENTS

WO    2017133552 A1    8/2017
WO    2018026541 A1    2/2018
(Continued)

OTHER PUBLICATIONS

Kundu, et al. "Physical Uplink Control Channel Design for 5G New Radio." 2018 IEEE 5G World Forum (5GWF), IEEE, 2018. 6 pages. https://arxiv.org/pdf/1809.09671.pdf.
(Continued)

*Primary Examiner* — Walli Z Butt
*Assistant Examiner* — Thad N Defauw
(74) *Attorney, Agent, or Firm* — Guntin & Gust, PLC; Atanu Das

(57) ABSTRACT

Facilitation of hybrid automatic repeat requests (HARQ) can comprise a system that acquires information about the capability of a mobile device. Next, the system can configure the mobile device with multiple physical uplink control channel (PUCCH) resources and a number of repetitions within a slot for each antenna port of the mobile device. A network node can then transmit a downlink control channel to the mobile device and indicate the PUCCH resources for each antenna port. Consequently, the system can then detect a HARQ acknowledgment (ACK) from the mobile device from all of the PUCCH resources.

20 Claims, 14 Drawing Sheets

Related U.S. Application Data

(60) Provisional application No. 62/760,705, filed on Nov. 13, 2018.

(51) Int. Cl.
*H04L 1/00* (2006.01)
*H04L 1/1812* (2023.01)
*H04L 1/1829* (2023.01)
*H04L 5/00* (2006.01)
*H04W 72/04* (2023.01)
*H04W 72/20* (2023.01)

(58) Field of Classification Search
CPC ......... H04L 1/1861; H04L 1/06; H04L 1/189; H04L 1/1896; H04B 7/0417; H04W 72/20

See application file for complete search history.

(56) References Cited

U.S. PATENT DOCUMENTS

| | | | |
|---|---|---|---|
| 2016/0242169 A1* | 8/2016 | Park | H04L 1/1812 |
| 2016/0242182 A1* | 8/2016 | Chen | H04B 7/061 |
| 2017/0026938 A1 | 1/2017 | Onggosanusi et al. | |
| 2018/0054285 A1 | 2/2018 | Chen et al. | |
| 2018/0103468 A1 | 4/2018 | Li et al. | |
| 2018/0167171 A1 | 6/2018 | Wu et al. | |
| 2018/0219649 A1 | 8/2018 | Mng et al. | |
| 2018/0234997 A1 | 8/2018 | Hosseini et al. | |
| 2018/0255532 A1 | 9/2018 | Li et al. | |
| 2018/0262311 A1 | 9/2018 | Wang et al. | |
| 2018/0262398 A1* | 9/2018 | Chen | H04L 41/0836 |
| 2018/0270853 A1 | 9/2018 | Hosseini et al. | |
| 2018/0279291 A1 | 9/2018 | Tiirola et al. | |
| 2018/0316395 A1 | 11/2018 | Sundararajan et al. | |
| 2018/0323925 A1 | 11/2018 | Huang et al. | |
| 2018/0324778 A1 | 11/2018 | Farajidana et al. | |
| 2020/0028635 A1* | 1/2020 | Lee | H04L 5/0094 |
| 2020/0221429 A1* | 7/2020 | Li | H04L 5/0053 |

FOREIGN PATENT DOCUMENTS

| | | |
|---|---|---|
| WO | 2018116051 A1 | 6/2018 |
| WO | 2018143785 A1 | 8/2018 |
| WO | 2018146229 A1 | 8/2018 |
| WO | 2018171444 A1 | 9/2018 |
| WO | 2018172136 A1 | 9/2018 |
| WO | 2018188717 A1 | 10/2018 |
| WO | 2018202192 A1 | 11/2018 |

OTHER PUBLICATIONS

Shariatmadari, et al. "Optimized Transmission and Resource Allocation Strategies for Ultra-Reliable Communications." Personal, Indoor, and Mobile Radio Communications (PIMRC), 2016 IEEE 27th Annual International Symposium, IEEE, 2016. 7 pages. https://research.aalto.fi/files/8134058/PIMRC2016_TRA.pdf.

Abreu, et al. "Pre-scheduled Resources for Retransmissions in Ultra-Reliable and Low Latency Communications." Wireless Communications and Networking Conference (WCNC), IEEE, 2017. 6 pages. http://vbn.aau.dk/files/252193556/bare_conf_shared_retx.pdf.

Anand, et al. "Resource Allocation and HARQ Optimization for URLLC Traffic in 5G Wireless Networks." arXiv preprint arXiv:1804.09201 (2018). 10 pages. https://arxiv.org/pdf/1804.09201.pdf.

Office Action dated Aug. 28, 2020 for U.S. Appl. No. 16/357,733, 37 pages.

Non-Final Office Action received for U.S. Appl. No. 16/357,733 dated Apr. 24, 2020, 40 pages.

* cited by examiner

HYBRID AUTOMATIC REPEAT REQUEST RELIABILITY FOR 5G OR OTHER NEXT GENERATION NETWORK

RELATED APPLICATIONS

The subject patent application is a continuation of, and claims priority to, U.S. patent application Ser. No. 16/357,733, filed Mar. 19, 2019, and entitled "HYBRID AUTOMATIC REPEAT REQUEST RELIABILITY FOR 5G OR OTHER NEXT GENERATION NETWORK," each of which applications claim priority to U.S. Provisional Patent Application No. 62/760,705, filed Nov. 13, 2018 and titled "HYBRID AUTOMATIC REPEAT REQUEST RELIABILITY FOR 5G OR OTHER NEXT GENERATION NETWORK." the entireties of all of which applications are incorporated herein by reference.

TECHNICAL FIELD

This disclosure relates generally to facilitating hybrid automatic repeat request reliability. For example, this disclosure relates to facilitating hybrid automatic repeat request reliability for low-latency communications with multiple transmit antennas for a 5G, or other next generation network, air interface.

BACKGROUND

5th generation (5G) wireless systems represent a next major phase of mobile telecommunications standards beyond the current telecommunications standards of $4^{th}$ generation (4G). Rather than faster peak Internet connection speeds, 5G planning aims at higher capacity than current 4G, allowing a higher number of mobile broadband users per area unit, and allowing consumption of higher or unlimited data quantities. This would enable a large portion of the population to stream high-definition media many hours per day with their mobile devices, when out of reach of wireless fidelity hotspots. 5G research and development also aims at improved support of machine-to-machine communication, also known as the Internet of things, aiming at lower cost, lower battery consumption, and lower latency than 4G equipment.

The above-described background relating to facilitating hybrid automatic repeat request reliability is merely intended to provide a contextual overview of some current issues, and is not intended to be exhaustive. Other contextual information may become further apparent upon review of the following detailed description.

BRIEF DESCRIPTION OF THE DRAWINGS

Non-limiting and non-exhaustive embodiments of the subject disclosure are described with reference to the following figures, wherein like reference numerals refer to like parts throughout the various views unless otherwise specified.

DETAILED DESCRIPTION

Figure 1:
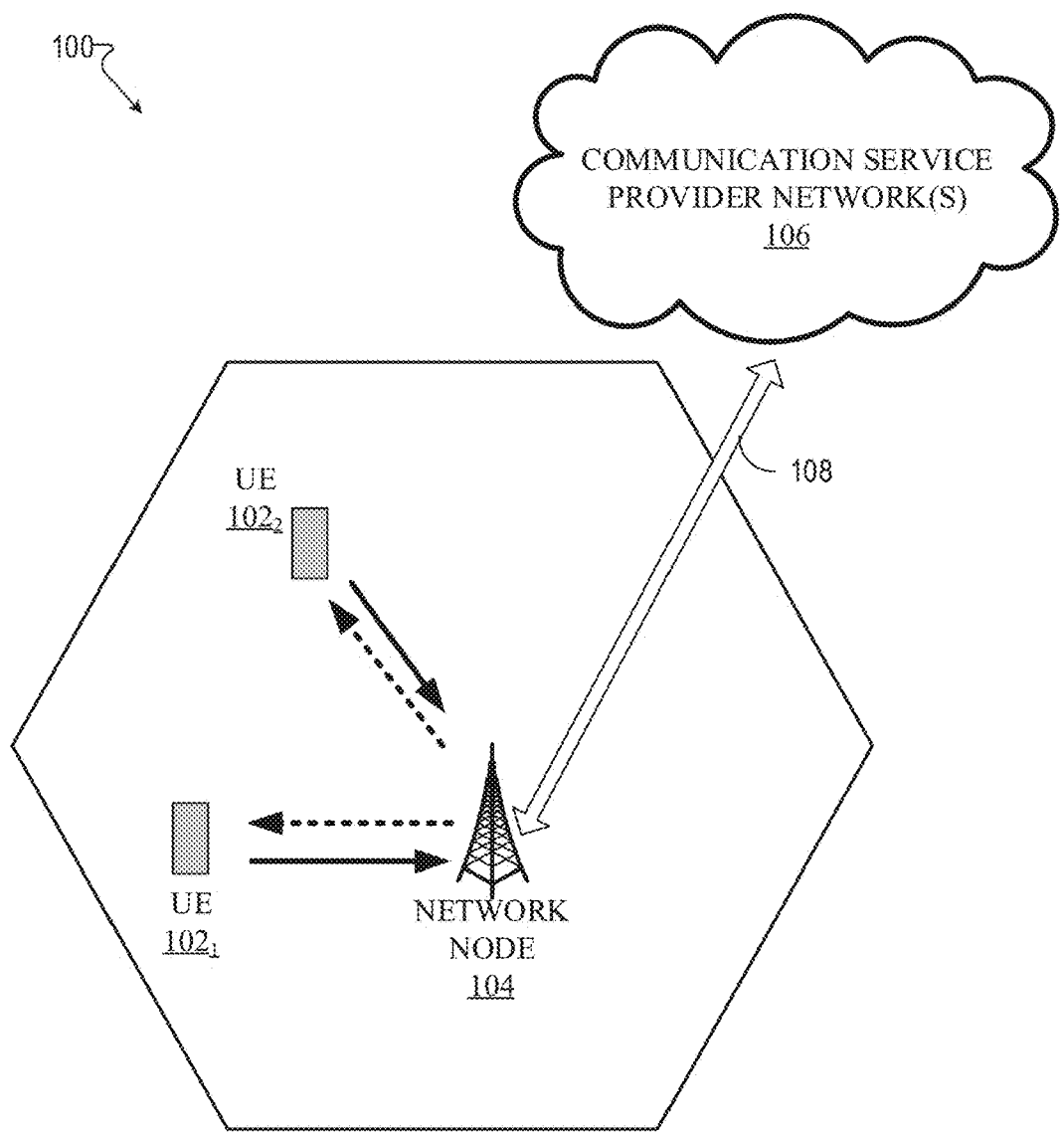
FIG. 1 illustrates an example wireless communication system in which a network node device (e.g., network node) and user equipment (UE) can implement various aspects and embodiments of the subject disclosure.

In the following description, numerous specific details are set forth to provide a thorough understanding of various embodiments. One skilled in the relevant art will recognize, however, that the techniques described herein can be practiced without one or more of the specific details, or with other methods, components, materials, etc. In other instances, well-known structures, materials, or operations are not shown or described in detail to avoid obscuring certain aspects.

Reference throughout this specification to "one embodiment," or "an embodiment," means that a particular feature, structure, or characteristic described in connection with the embodiment is included in at least one embodiment. Thus, the appearances of the phrase "in one embodiment," "in one aspect." or "in an embodiment," in various places throughout this specification are not necessarily all referring to the same embodiment. Furthermore, the particular features, structures, or characteristics may be combined in any suitable manner in one or more embodiments.

As utilized herein, terms "component." "system," "interface," and the like are intended to refer to a computer-related entity, hardware, software (e.g., in execution), and/or firmware. For example, a component can be a processor, a process running on a processor, an object, an executable, a program, a storage device, and/or a computer. By way of illustration, an application running on a server and the server can be a component. One or more components can reside within a process, and a component can be localized on one computer and/or distributed between two or more computers.

Further, these components can execute from various machine-readable media having various data structures stored thereon. The components can communicate via local and/or remote processes such as in accordance with a signal having one or more data packets (e.g., data from one component interacting with another component in a local system, distributed system, and/or across a network, e.g., the Internet, a local area network, a wide area network, etc. with other systems via the signal).

As another example, a component can be an apparatus with specific functionality provided by mechanical parts operated by electric or electronic circuitry; the electric or electronic circuitry can be operated by a software application or a firmware application executed by one or more processors; the one or more processors can be internal or external to the apparatus and can execute at least a part of the software or firmware application. As yet another example, a component can be an apparatus that provides specific functionality through electronic components without mechanical parts; the electronic components can include one or more processors therein to execute software and/or firmware that confer(s), at least in part, the functionality of the electronic components. In an aspect, a component can emulate an electronic component via a virtual machine, e.g., within a cloud computing system.

The words "exemplary" and/or "demonstrative" are used herein to mean serving as an example, instance, or illustration. For the avoidance of doubt, the subject matter disclosed herein is not limited by such examples. In addition, any aspect or design described herein as "exemplary" and/or "demonstrative" is not necessarily to be construed as preferred or advantageous over other aspects or designs, nor is it meant to preclude equivalent exemplary structures and techniques known to those of ordinary skill in the art. Furthermore, to the extent that the terms "includes," "has," "contains," and other similar words are used in either the detailed description or the claims, such terms are intended to be inclusive—in a manner similar to the term "comprising" as an open transition word-without precluding any additional or other elements.

As used herein, the term "infer" or "inference" refers generally to the process of reasoning about, or inferring states of, the system, environment, user, and/or intent from a set of observations as captured via events and/or data. Captured data and events can include user data, device data, environment data, data from sensors, sensor data, application data, implicit data, explicit data, etc. Inference can be employed to identify a specific context or action, or can generate a probability distribution over states of interest based on a consideration of data and events, for example.

Inference can also refer to techniques employed for composing higher-level events from a set of events and/or data. Such inference results in the construction of new events or actions from a set of observed events and/or stored event data, whether the events are correlated in close temporal proximity, and whether the events and data come from one or several event and data sources. Various classification schemes and/or systems (e.g., support vector machines, neural networks, expert systems, Bayesian belief networks, fuzzy logic, and data fusion engines) can be employed in connection with performing automatic and/or inferred action in connection with the disclosed subject matter.

In addition, the disclosed subject matter can be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, machine-readable device, computer-readable carrier, computer-readable media, or machine-readable media. For example, computer-readable media can include, but are not limited to, a magnetic storage device, e.g., hard disk; floppy disk; magnetic strip(s); an optical disk (e.g., compact disk (CD), a digital video disc (DVD), a Blu-ray Disc™ (BD)); a smart card; a flash memory device (e.g., card, stick, key drive); and/or a virtual device that emulates a storage device and/or any of the above computer-readable media.

As an overview, various embodiments are described herein to facilitate hybrid automatic repeat request reliability for a 5G air interface or other next generation networks. For simplicity of explanation, the methods (or algorithms) are depicted and described as a series of acts. It is to be understood and appreciated that the various embodiments are not limited by the acts illustrated and/or by the order of acts. For example, acts can occur in various orders and/or concurrently, and with other acts not presented or described herein. Furthermore, not all illustrated acts may be required to implement the methods. In addition, the methods could alternatively be represented as a series of interrelated states via a state diagram or events. Additionally, the methods described hereafter are capable of being stored on an article of manufacture (e.g., a machine-readable storage medium) to facilitate transporting and transferring such methodologies to computers. The term article of manufacture, as used herein, is intended to encompass a computer program accessible from any computer-readable device, carrier, or media, including a non-transitory machine-readable storage medium.

It should be noted that although various aspects and embodiments have been described herein in the context of 5G, Universal Mobile Telecommunications System (UMTS), and/or Long Term Evolution (LTE), or other next generation networks, the disclosed aspects are not limited to 5G, a UMTS implementation, and/or an LTE implementation as the techniques can also be applied in 3G, 4G or LTE systems. For example, aspects or features of the disclosed embodiments can be exploited in substantially any wireless communication technology. Such wireless communication technologies can include UMTS, Code Division Multiple Access (CDMA), Wi-Fi, Worldwide Interoperability for Microwave Access (WiMAX), General Packet Radio Service (GPRS), Enhanced GPRS, Third Generation Partnership Project (3GPP), LTE, Third Generation Partnership Project 2 (3GPP2) Ultra Mobile Broadband (UMB), High Speed Packet Access (HSPA), Evolved High Speed Packet Access (HSPA+), High-Speed Downlink Packet Access (HSDPA), High-Speed Uplink Packet Access (HSUPA), Zigbee, or another IEEE 802.XX technology. Additionally, substantially all aspects disclosed herein can be exploited in legacy telecommunication technologies.

Described herein are systems, methods, articles of manufacture, and other embodiments or implementations that can facilitate hybrid automatic repeat request reliability for a 5G network. Facilitating hybrid automatic repeat request reliability for a 5G network can be implemented in connection with any type of device with a connection to the communications network (e.g., a mobile handset, a computer, a handheld device, etc.) any Internet of things (IoT) device (e.g., toaster, coffee maker, blinds, music players, speakers, etc.), and/or any connected vehicles (cars, airplanes, space rockets, and/or other at least partially automated vehicles (e.g., drones)). In some embodiments the non-limiting term user equipment (UE) is used. It can refer to any type of wireless device that communicates with a radio network node in a cellular or mobile communication system. Examples of UE are target device, device to device (D2D) UE, machine type UE or UE capable of machine to machine (M2M) communication, PDA, Tablet, mobile terminals, smart phone, laptop embedded equipped (LEE), laptop mounted equipment (LME), USB dongles etc. Note that the terms element, elements and antenna ports can be interchangeably used but carry the same meaning in this disclosure. The embodiments are applicable to single carrier as well as to multicarrier (MC) or carrier aggregation (CA) operation of the UE. The term carrier aggregation (CA) is also called (e.g. interchangeably called) "multi-carrier system", "multi-cell operation", "multi-carrier operation", "multi-carrier" transmission and/or reception.

In some embodiments the non-limiting term radio network node or simply network node is used. It can refer to any type of network node that serves UE is connected to other network nodes or network elements or any radio node from where UE receives a signal. Examples of radio network nodes are Node B, base station (BS), multi-standard radio (MSR) node such as MSR BS, eNode B, network controller, radio network controller (RNC), base station controller (BSC), relay, donor node controlling relay, base transceiver station (BTS), access point (AP), transmission points, transmission nodes, RRU, RRH, nodes in distributed antenna system (DAS) etc.

Cloud radio access networks (RAN) can enable the implementation of concepts such as software-defined network (SDN) and network function virtualization (NFV) in 5G networks. This disclosure can facilitate a generic channel state information framework design for a 5G network. Certain embodiments of this disclosure can comprise an SDN controller that can control routing of traffic within the network and between the network and traffic destinations. The SDN controller can be merged with the 5G network architecture to enable service deliveries via open application programming interfaces ("APIs") and move the network core towards an all internet protocol ("IP"), cloud based, and software driven telecommunications network. The SDN controller can work with, or take the place of policy and charging rules function ("PCRF") network elements so that policies such as quality of service and traffic management and routing can be synchronized and managed end to end.

To meet the huge demand for data centric applications, 4G standards can be applied 5G, also called new radio (NR) access. 5G networks can comprise the following: data rates of several tens of megabits per second supported for tens of thousands of users; 1 gigabit per second can be offered simultaneously to tens of workers on the same office floor; several hundreds of thousands of simultaneous connections can be supported for massive sensor deployments; spectral efficiency can be enhanced compared to 4G; improved coverage; enhanced signaling efficiency; and reduced latency compared to LTE. In multicarrier system such as OFDM, each subcarrier can occupy bandwidth (e.g., subcarrier spacing). If the carriers use the same bandwidth spacing, then it can be considered a single numerology. However, if the carriers occupy different bandwidth and/or spacing, then it can be considered a multiple numerology.

Downlink reference signals are predefined signals occupying specific resource elements (RE) within a downlink time-frequency grid. There are several types of downlink reference signals that can be transmitted in different ways and used for different purposes by a receiving terminal. Channel state information reference signals (CSI-RS) can be used by terminals to acquire channel-state information (CSI) and beam specific information (e.g., beam reference signal received power). In 5G, CSI-RS can be user equipment (UE) specific so it can have a significantly lower time/frequency density. Demodulation reference signals (DM-RS), also sometimes referred to as UE-specific reference signals, can be used by terminals for channel estimation of data channels. The label "UE-specific" relates to each demodulation reference signal being intended for channel estimation by a single terminal. The demodulation reference signal can then be transmitted within the resource blocks assigned for data traffic channel transmission to that terminal. Other than the aforementioned reference signals, there are other reference signals, namely multi-cast broadcast single frequency network (MBSFN) and positioning reference signals that can be used for various purposes.

A physical downlink control channel (PDCCH) can carry information about scheduling grants. Typically, this comprises a of number of multiple-in multiple-out (MIMO) layers scheduled, transport block sizes, modulation for each code word, parameters related to a hybrid automatic repeat request (HARQ), sub band locations etc. It should be noted that all downlink control information (DCI) formats may not transmit all the information as shown above. In general, the contents of PDCCH can depend on a transmission mode and a DCI format. Typically, the following information is transmitted by means of the DCI format: carrier indicator, identifier for dci formats, bandwidth part indicator, frequency domain resource assignment, time domain resource assignment, virtual resource block (VRB) to physical resource block (PRB) mapping flag, PRB bundling size indicator, rate matching indicator, zero-punctuation (ZP) CSI-RS trigger, modulation and coding scheme for each transport block (TB), new data indicator for each TB, redundancy version for each TB, HARQ process number, downlink assignment index, transaction processing benchmark (TPC) command for uplink control channel, physical uplink control channel (PUCCH) resource indicator, physical downlink scheduling channel to HARQ feedback timing indicator, antenna port(s), transmission configuration indication, system requirement specification (SRS) request, codeblock group (CBG) transmission information, CBG flushing out information, and/or demodulation reference signal (DMRS) sequence initialization.

The uplink control channel can carry information about HARQ-acknowledgment (ACK) information corresponding to the downlink data transmission, and channel state information. The channel state information typically comprises: CRI, RI, CQI, PMI and layer indicator data, etc. The CSI can be divided into two categories: one for sub-band and the other for wideband. The configuration of sub-band or wideband CSI reporting can be done through RRC signaling as part of CSI reporting configuration. Table 1 depicts the contents of a CSI report for PMI format indicator=Wideband, CQI format indicator=wideband and for PMI format indicator=sub-band, CQI format indicator=sub-band.

TABLE 1

Contents of CSI report for both wideband and side band

| PMI-Format Indicator = wideband PMI and CQI-Format Indicator = wideband CQI | PMI-Format Indicator = sub-band PMI or CQI-Format Indicator = sub-band CQI | | |
|---|---|---|---|
| | | CSI Part II | |
| | CSI Part I | wideband | sub-band |
| CRI | CRI | Wideband CQI for the second TB | Sub-band differential CQI for the second TB (transport block) of all even sub-bands |
| Rank Indicator | Rank Indicator | PMI wideband (X1 and X2) | PMI sub-band information fields $X_2$ of all even sub-bands |
| Layer Indicator | Layer Indicator | | Sub-band differential CQI for the second TB of all odd sub-bands |
| PMI wideband (X1 and X2) | Wideband CQI | | PMI sub-band information fields $X_2$ of all odd sub-bands |
| Wideband CQI | Sub-band differential CQI for the first TB | | |

Note that for NR, the sub-band is defined according to the bandwidth part of the OFDM in terms of PRBs as shown in Table 2. The sub-band configuration is also done through RRC signaling.

TABLE 2

Configurable sub-band sizes

| Carrier bandwidth part (PRBs) | Sub-band Size (PRBs) |
|---|---|
| <24 | N/A |
| 24-72 | 4, 8 |
| 73-144 | 8, 16 |
| 145-275 | 16, 32 |

As mentioned in the above sections, when the UE is configured to report sub band PMI and sub band CQI, the UE can send feedback either on wideband CQI and wideband precoding matrix index (PMI), or sub band CQI and sub band precoding matrix index based on the RRC configuration of CSI reporting. However, the current 5G specifications do not support sub band based scheduling, as the downlink control channel indicates only one MCS field. Thus, even though the UE can report the sub band CQI (i.e. SINR), the network can't use this information, as the network needs to average the SINR over all the sub bands to determine the resultant SINR i.e. the MCS. This results in reduction in throughput and the use of sub band reporting becomes a useless feature for 5G systems.

Although embodiments herein are described for downlink data transmission for MIMO systems, the same principle can be applicable for uplink and side link systems. Rather than using a single scheduling grant/downlink control channel for scheduling all the sub bands, the network can use multiple scheduling grants/downlink control channels where each downlink control structure can indicate scheduling of one or more sub bands, thereby providing gains. This is because each downlink control channel can indicate its own MCS thereby providing network flexibility.

NR defines five PUCCH formats for reporting HARQ-ACK, SR and CSI. Table 1 summarizes the characteristics of each PUCCH format. Formats 1 and 2 can be used for sending HARQ-ACK. Long PUCCH formats can be used for HARQ-ACK and CSI. This disclosure discusses PUCCH formats 0 and 1. However, the same principle is applicable for other formats.

TABLE 3

PUCCH Formats in NR

| Format Name | Alternative name | Symbol length | Waveform | Information | Single UE/Multiple UE |
|---|---|---|---|---|---|
| Format 0 | Short PUCCH <= 2 bits | 1-2 | CP-OFDM | HARQ-ACK, SR | Single UE |
| Format 1 | Long PUCCH <= 2 bits | 4-14 | CP-OFDM | HARQ-ACK, SR | Single UE |
| Format 2 | Short PUCCH > 2 bits | 1-2 | CP-OFDM | CSI | Single UE |
| Format 3 | Long PUCCH > 2 bits | 4-14 | DFT-s-OFDM | CSI | Single UE |
| Format 4 | Long PUCCH > 2 bits | 4-14 | DFT-s-OFDM | CSI | Multiple UEs |

The reliability for NR URLLC applications is important for robust transmissions of PDSCH, PUSCH, and HARQ-ACK. For example, Table 4 shows the reliability requirement for URLLC use cases.

TABLE 4

Reliability Requirements for NR URLLC Applications

| Use case (Clause #) | Reliability (%) | End-to-end latency (ms) | # of UEs (per cell) | Data packet size | Description |
|---|---|---|---|---|---|
| Transport Industry | 99.999 | 5 | [30] (Note 1) | DL: [250] byte (Note 2) UL: [2572] byte (Note 3) | Remote driving |
| Power distribution | 99.9999 | 5 | [8] (Note 4) | [80] byte (Note 5) | Power distribution grid fault and outage management |
| | [99.999] (Note 6) | 15 | [8] (Note 4) | 250 byte | Differential protection |
| Factory automation | 99.9999 | 2 | 4 (Note 7) | 20 byte | Motion control |

For robust transmission of PDSCH, reliability of AHRQ-ACK can be important. For example, if the UE sends NACK and the network detects the NACK as HARQ-ACK, then the network cannot retransmit the packet, as it assumes it was properly received by the UE. Thus, the fails to meet the requirements set for the URLLC applications. This disclosure proposes a method for improving the performance/reliability of PUCCH for URLLC applications with multiple transmit antennas at the UE. The method can comprise the network configuring the UE with multiple PUCCH resources and configuring the UE with a number of repetitions such that the UE can repeat the HARQ-ACK over multiple time/frequency resources. The network can dynamically indicate the resources for each HARQ-ACK per each antenna port as part of downlink control channel. The UE can repeat the HARQ-ACK information over the specified resources for each antenna port and transmit to the network. The network can then combine the HARQ-ACK over these resources and antenna ports and improve the performance/reliability of the PUCCH.

The disclosure can comprise embodiments, which can be implemented in the network node and in the UE. For example, the system can obtain information about the capability of the UE about the URLLC supporting the UE. Next, the system can configure the UE with multiple PUCCH resources and the number of repetitions within a slot for each antenna port. The network node can then transmit the downlink control channel to the UE and indicate the PUCCH resources dynamically for each antenna port. Consequently, the system can then detect the HARQ-ACK from the UE from all the PUCCH resources.

In another embodiment, the UE can transmit HARQ-ACK and reference signal data to the gNodeB. For example, the UE can receive configuring parameters from the network node, and determine the HARQ-ACK from the PDSCH cyclic redundancy check (CRC). Thereafter, the UE can apply the recommended PUCCH format settings and transmit the uplink control information with multiple antennas on the specified resources.

The proposed solution facilitates better detection capability for uplink control channels, thereby achieving significant gains in block error rate for PUCCH. This, in turn, improves the NR coverage, which allows for a robust performance of the UL control channel even at low SINR conditions. Thus, the solution is attractive for URLLC applications, which demand high reliability for all SNRs.

It the UE is configured with multiple transmit antennas (e.g., antenna ports), then rather than using single PUCCH resource for transmitting HARQ-ACK, the network can configure the UE with multiple PUCCH resources such that the UE can repeat the HARQ-ACK information over these elements within a slot for each antenna port. Note, this is different compared to the multi slot PUCCH where the same information can be repeated over multiple slots.

First the network can obtain information about the UE capability (e.g., whether the UE can support multiple HARQ-ACK within a slot and/or comprise multiple antenna ports). For example, whether the UE is capable of supporting URLLC applications or not. Once the network obtains information about the UE capability, the network can configure the UE with a number of antenna ports for PUCCH transmission, and/or a repetition factor for each PUCCH format, (e.g., the factor N can be 4 for PUCCH format 0 and 2 for PUCCH format 1, and the value can be equal to 2 for PUCCH format 2, etc.). Note that the repetition factor can be equal to each antenna port. The network can limit the maximum number of repetitions to a specific value. In addition, the network can define a set of PUCCH resources for the UE. Now we define what is meant by PUCCH resource.

A PUCCH resource can comprise one or more of the following parameters: an index of the first symbol, a number of OFDM symbols, an index of the first PRB prior to frequency hopping or for no frequency hopping, an index of the first PRB after frequency hopping, a number of PRBs, frequency hopping (e.g., frequency hopping for a PUCCH resource can either be enabled or disabled), an index of the cyclic shift, an index of an orthogonal cover code, an index of an orthogonal cover code, and/or a spreading factor for an orthogonal cover code.

The UE can be configured with a number of sets of PUCCH resources by a higher layer parameter PUCCH-resource-set, where the number of PUCCH resources in each set of PUCCH resources can be provided by the higher layer parameter PUCCH-resource-set-size. A PUCCH resource in a set of PUCCH resources can be indicated by a higher layer parameter PUCCH-resource-index. It should be noted that all or some of these parameters can be sent using RRC signaling.

Once the network configures the UE with multiple PUCCH resources and the repetition factor within a slot, the network can indicate the PUCCH resources for each of the repetition HARQ-ACK in the downlink control channel. Once the UE receives the DCI and the PDSCH, the UE can check the CRC and determine the HARQ-ACK (e.g., HARQ-ACK or HARQ-NAK) and then it repeat the same sequence over the multiple PUCCH resources as indicated by the network.

The HARQ-ACK can also be determined at the network node. For example, the network node can estimate the channel. For PUCCH format 0, the network can estimate the channel on the common resource elements for HARQ-ACK and HARQ-NAK for PUCCH format 1, and use the DMRS to estimate the channel. The network can then interpolate the channel estimates based on the estimated channel on the other PUCCH resources. Once the channel estimation of PUCCH resources is done, the network can use a maximum likelihood metric to choose between HARQ-ACK or HARQ-NAK as follows:

$$z1 = \|R - Hx1\|^2 \qquad \text{Equation 1:}$$

$$z2 = \|R - Hx2\|^2 \qquad \text{Equation 2:}$$

If z1<22, HARQ-ACK was chosen else HARQ-NAKC can be selected. In the above equation, R is the received signal, H is the channel estimated from the reference signal (and interpolated), x1 is the constant amplitude zero autocorrelation (CAZAC) sequence corresponding to the HARQ-ACK, and x2 is the CAZAC sequence corresponding to HARQ-NAK. Note that here z1 and z2 are the column vectors where the received signal is stacked over all the PUCCH resources, similarly H is the channel stacked over all the PUCCH resources.

In one embodiment, described herein is a method comprising transmitting, by a wireless network device comprising a processor to a mobile device, physical uplink control channel data associated with a network resource of a wireless network to facilitate configuration of the mobile device. In response to the transmitting, the method can comprise receiving, by the wireless network device, acknowledgment data associated with a hybrid automatic repeat request. Based on the acknowledgment data, the method can comprise indicating, by the wireless network device to the mobile device, the network resource in a downlink control channel between the network device and the mobile device. Additionally, in response to the indicating the network resource, the method can comprise receiving, by the wireless network device, hybrid automatic repeat request data representative of the hybrid automatic repeat request.

According to another embodiment, a system can facilitate, receiving, from a network device via a physical downlink shared channel, configuration data associated with a physical uplink control channel setting applicable to a physical uplink control channel of a wireless network. Based on the configuration data, the system can comprise determining a hybrid automatic repeat request. Furthermore, in response to the determining the hybrid automatic repeat request, the system can comprise applying the hybrid automatic repeat request to a transmission, wherein the applying comprises configuring the transmission to send physical uplink control channel data via the physical uplink control channel based on the physical uplink control channel setting.

According to yet another embodiment, described herein is a machine-readable storage medium that can facilitate performance of at least one of any of the acts or operations described here. The machine-readable storage medium can facilitate transmitting physical uplink control channel data, associated with a network resource of a wireless network, to a mobile device to facilitate configuration of the mobile device. In response to the facilitating the transmitting, the machine-readable storage medium can facilitate receiving acknowledgment data associated with a hybrid automatic repeat request. Based on the receiving the acknowledgment data, the machine-readable storage medium can facilitate indicating, to the mobile device, the network resource in a downlink control channel between a network device and the mobile device. Additionally, in response to the facilitating the indicating the network resource, the machine-readable storage medium can facilitate receiving hybrid automatic repeat request data representative of the hybrid automatic repeat request.

These and other embodiments or implementations are described in more detail below with reference to the drawings.

Referring now to FIG. 1, illustrated is an example wireless communication system 100 in accordance with various aspects and embodiments of the subject disclosure. In one or more embodiments, system 100 can comprise one or more user equipment UEs 102. The non-limiting term user equipment can refer to any type of device that can communicate with a network node in a cellular or mobile communication system. A UE can have one or more antenna panels having vertical and horizontal elements. Examples of a UE comprise a target device, device to device (D2D) UE, machine type UE or UE capable of machine to machine (M2M) communications, personal digital assistant (PDA), tablet, mobile terminals, smart phone, laptop mounted equipment (LME), universal serial bus (USB) dongles enabled for mobile communications, a computer having mobile capabilities, a mobile device such as cellular phone, a laptop having laptop embedded equipment (LEE, such as a mobile broadband adapter), a tablet computer having a mobile broadband adapter, a wearable device, a virtual reality (VR) device, a heads-up display (HUD) device, a smart car, a machine-type communication (MTC) device, and the like. User equipment UE 102 can also comprise IoT devices that communicate wirelessly.

In various embodiments, system 100 is or comprises a wireless communication network serviced by one or more wireless communication network providers. In example embodiments, a UE 102 can be communicatively coupled to the wireless communication network via a network node 104. The network node (e.g., network node device) can communicate with user equipment (UE), thus providing connectivity between the UE and the wider cellular network. The UE 102 can send transmission type recommendation data to the network node 104. The transmission type recommendation data can comprise a recommendation to transmit data via a closed loop MIMO mode and/or a rank-1 precoder mode.

A network node can have a cabinet and other protected enclosures, an antenna mast, and multiple antennas for performing various transmission operations (e.g., MIMO operations). Network nodes can serve several cells, also called sectors, depending on the configuration and type of antenna. In example embodiments, the UE 102 can send and/or receive communication data via a wireless link to the network node 104. The dashed arrow lines from the network node 104 to the UE 102 represent downlink (DL) communications and the solid arrow lines from the UE 102 to the network nodes 104 represents an uplink (UL) communication.

System 100 can further include one or more communication service provider networks 106 that facilitate providing wireless communication services to various UEs, including UE 102, via the network node 104 and/or various additional network devices (not shown) included in the one or more communication service provider networks 106. The one or more communication service provider networks 106 can include various types of disparate networks, including but not limited to: cellular networks, femto networks, picocell networks, microcell networks, internet protocol (IP) networks Wi-Fi service networks, broadband service network, enterprise networks, cloud based networks, and the like. For example, in at least one implementation, system 100 can be or include a large scale wireless communication network that spans various geographic areas. According to this implementation, the one or more communication service provider networks 106 can be or include the wireless communication network and/or various additional devices and components of the wireless communication network (e.g., additional network devices and cell, additional UEs, network server devices, etc.). The network node 104 can be connected to the one or more communication service provider networks 106 via one or more backhaul links 108. For example, the one or more backhaul links 108 can comprise wired link components, such as a T1/E1 phone line, a digital subscriber line (DSL) (e.g., either synchronous or asynchronous), an asymmetric DSL (ADSL), an optical fiber backbone, a coaxial cable, and the like. The one or more backhaul links 108 can also include wireless link components, such as but not limited to, line-of-sight (LOS) or non-LOS links which can include terrestrial air-interfaces or deep space links (e.g., satellite communication links for navigation).

Wireless communication system 100 can employ various cellular systems, technologies, and modulation modes to facilitate wireless radio communications between devices (e.g., the UE 102 and the network node 104). While example embodiments might be described for 5G new radio (NR) systems, the embodiments can be applicable to any radio access technology (RAT) or multi-RAT system where the UE operates using multiple carriers e.g. LTE FDD/TDD, GSM/GERAN, CDMA2000 etc.

For example, system 100 can operate in accordance with global system for mobile communications (GSM), universal mobile telecommunications service (UMTS), long term evolution (LTE), LTE frequency division duplexing (LTE FDD, LTE time division duplexing (TDD), high speed packet access (HSPA), code division multiple access (CDMA), wideband CDMA (WCMDA), CDMA2000, time division multiple access (TDMA), frequency division multiple access (FDMA), multi-carrier code division multiple access (MC-CDMA), single-carrier code division multiple access (SC-CDMA), single-carrier FDMA (SC-FDMA), orthogonal frequency division multiplexing (OFDM), discrete Fourier transform spread OFDM (DFT-spread OFDM) single carrier FDMA (SC-FDMA), Filter bank based multi-carrier (FBMC), zero tail DFT-spread-OFDM (ZT DFT-s-OFDM), generalized frequency division multiplexing (GFDM), fixed mobile convergence (FMC), universal fixed mobile convergence (UFMC), unique word OFDM (UW-OFDM), unique word DFT-spread OFDM (UW DFT-Spread-OFDM), cyclic prefix OFDM CP-OFDM, resource-block-filtered OFDM, Wi Fi, WLAN, WiMax, and the like. However, various features and functionalities of system 100 are particularly described wherein the devices (e.g., the UEs 102 and the network device 104) of system 100 are configured to communicate wireless signals using one or more multi carrier modulation schemes, wherein data symbols can be transmitted simultaneously over multiple frequency subcarriers (e.g., OFDM, CP-OFDM, DFT-spread OFMD, UFMC, FMBC, etc.). The embodiments are applicable to single carrier as well as to multicarrier (MC) or carrier aggregation (CA) operation of the UE. The term carrier aggregation (CA) is also called (e.g. interchangeably called) "multi-carrier system", "multi-cell operation", "multi-carrier operation", "multi-carrier" transmission and/or reception. Note that some embodiments are also applicable for Multi RAB (radio bearers) on some carriers (that is data plus speech is simultaneously scheduled).

In various embodiments, system 100 can be configured to provide and employ 5G wireless networking features and functionalities. 5G wireless communication networks are expected to fulfill the demand of exponentially increasing data traffic and to allow people and machines to enjoy gigabit data rates with virtually zero latency. Compared to 4G, 5G supports more diverse traffic scenarios. For example, in addition to the various types of data communication between conventional UEs (e.g., phones, smartphones, tablets, PCs, televisions, Internet enabled televisions, etc.) supported by 4G networks, 5G networks can be employed to support data communication between smart cars in association with driverless car environments, as well as machine type communications (MTCs). Considering the drastic different communication needs of these different traffic scenarios, the ability to dynamically configure waveform parameters based on traffic scenarios while retaining the benefits of multi carrier modulation schemes (e.g., OFDM and related schemes) can provide a significant contribution to the high speed/capacity and low latency demands of 5G networks. With waveforms that split the bandwidth into several sub-bands, different types of services can be accommodated in different sub-bands with the most suitable waveform and numerology, leading to an improved spectrum utilization for 5G networks.

To meet the demand for data centric applications, features of proposed 5G networks may comprise: increased peak bit rate (e.g., 20 Gbps), larger data volume per unit area (e.g., high system spectral efficiency—for example about 3.5 times that of spectral efficiency of long term evolution (LTE) systems), high capacity that allows more device connectivity both concurrently and instantaneously, lower battery/power consumption (which reduces energy and consumption costs), better connectivity regardless of the geographic region in which a user is located, a larger numbers of devices, lower infrastructural development costs, and higher reliability of the communications. Thus, 5G networks may allow for: data rates of several tens of megabits per second should be supported for tens of thousands of users, 1 gigabit per second to be offered simultaneously to tens of workers on the same office floor, for example; several hundreds of thousands of simultaneous connections to be supported for massive sensor deployments; improved coverage, enhanced signaling efficiency; reduced latency compared to LTE.

The upcoming 5G access network may utilize higher frequencies (e.g., >6 GHZ) to aid in increasing capacity. Currently, much of the millimeter wave (mm Wave) spectrum, the band of spectrum between 30 gigahertz (GHz) and 300 GHz is underutilized. The millimeter waves have shorter wavelengths that range from 10 millimeters to 1 millimeter, and these mmWave signals experience severe path loss, penetration loss, and fading. However, the shorter wavelength at mmWave frequencies also allows more antennas to be packed in the same physical dimension, which allows for large-scale spatial multiplexing and highly directional beamforming.

Performance can be improved if both the transmitter and the receiver are equipped with multiple antennas. Multi-antenna techniques can significantly increase the data rates and reliability of a wireless communication system. The use of multiple input multiple output (MIMO) techniques, which was introduced in the third-generation partnership project (3GPP) and has been in use (including with LTE), is a multi-antenna technique that can improve the spectral efficiency of transmissions, thereby significantly boosting the overall data carrying capacity of wireless systems. The use of multiple-input multiple-output (MIMO) techniques can improve mmWave communications, and has been widely recognized a potentially important component for access networks operating in higher frequencies. MIMO can be used for achieving diversity gain, spatial multiplexing gain and beamforming gain. For these reasons, MIMO systems are an important part of the 3rd and 4th generation wireless systems, and are planned for use in 5G systems.

Figure 2:
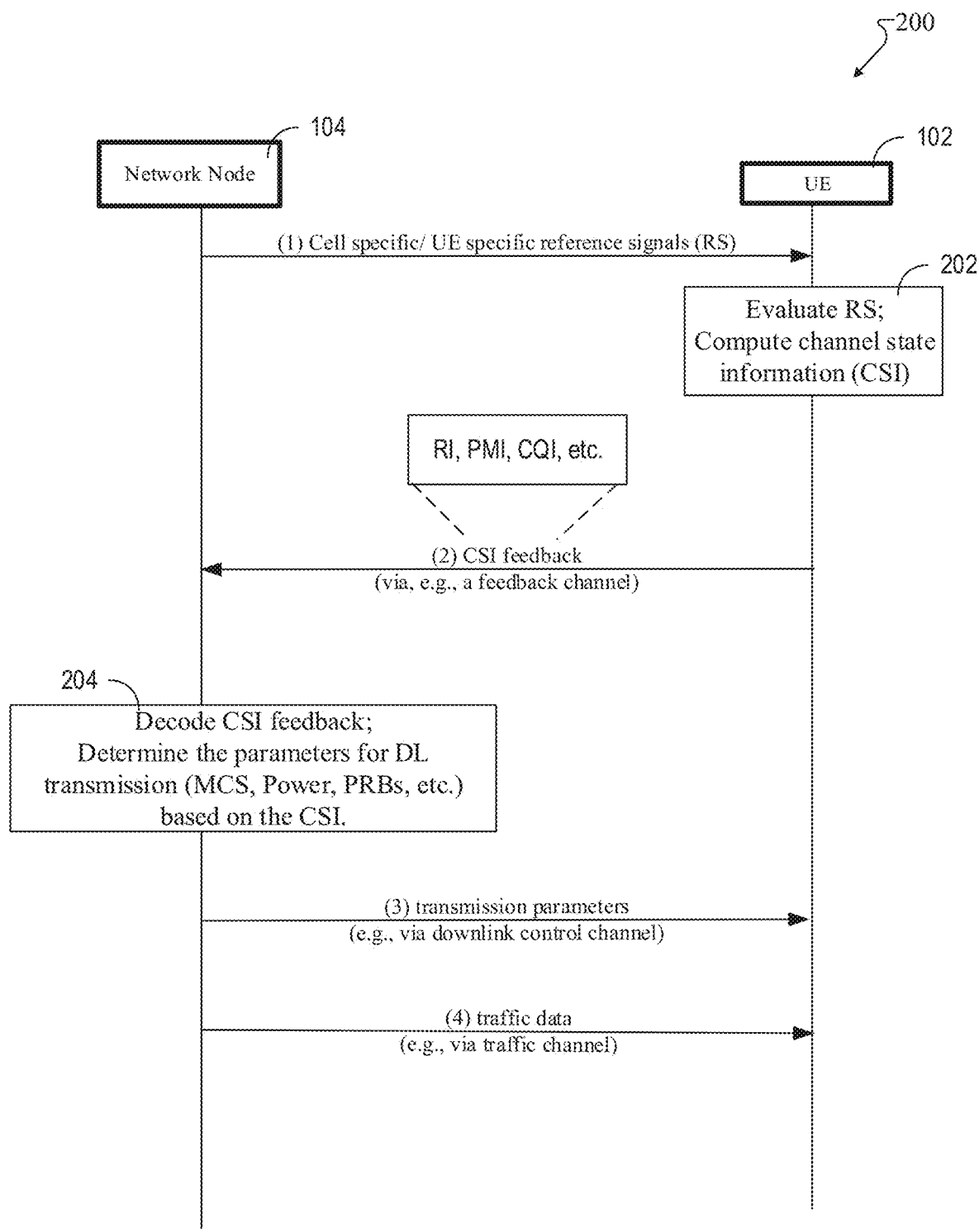
FIG. 2 illustrates an example schematic system block diagram of a message sequence chart between a network node and UE according to one or more embodiments.

Referring now to FIG. 2, illustrated is an example schematic system block diagram of a message sequence chart between a network node and user equipment according to one or more embodiments.

FIG. 2 depicts a message sequence chart for downlink data transfer in 5G systems 200. The network node 104 can transmit reference signals to a user equipment (UE) 102. The reference signals can be cell specific and/or user equipment 102 specific in relation to a profile of the user equipment 102 or some type of mobile identifier. From the reference signals, the user equipment 102 can compute channel state information (CSI) and compute parameters needed for a CSI report at block 202. The CSI report can comprise: a channel quality indicator (CQI), a pre-coding matrix index (PMI), rank information (RI), a CSI-resource indicator (e.g., CRI the same as beam indicator), etc.

The user equipment 102 can then transmit the CSI report to the network node 104 via a feedback channel either on request from the network node 104, a-periodically, and/or periodically. A network scheduler can leverage the CSI report to determine downlink transmission scheduling parameters at 204, which are particular to the user equipment 102. The scheduling parameters 204 can comprise modulation and coding schemes (MCS), power, physical resource blocks (PRBs), etc. FIG. 2 depicts the physical layer signaling where the density change can be reported for the physical layer signaling or as a part of the radio resource control (RRC) signaling. In the physical layer, the density can be adjusted by the network node 104 and then sent over to the user equipment 102 as a part of the downlink control channel data. The network node 104 can transmit the scheduling parameters, comprising the adjusted densities, to the user equipment 102 via the downlink control channel. Thereafter and/or simultaneously, data can be transferred, via a data traffic channel, from the network node 104 to the user equipment 102.

Figure 3:
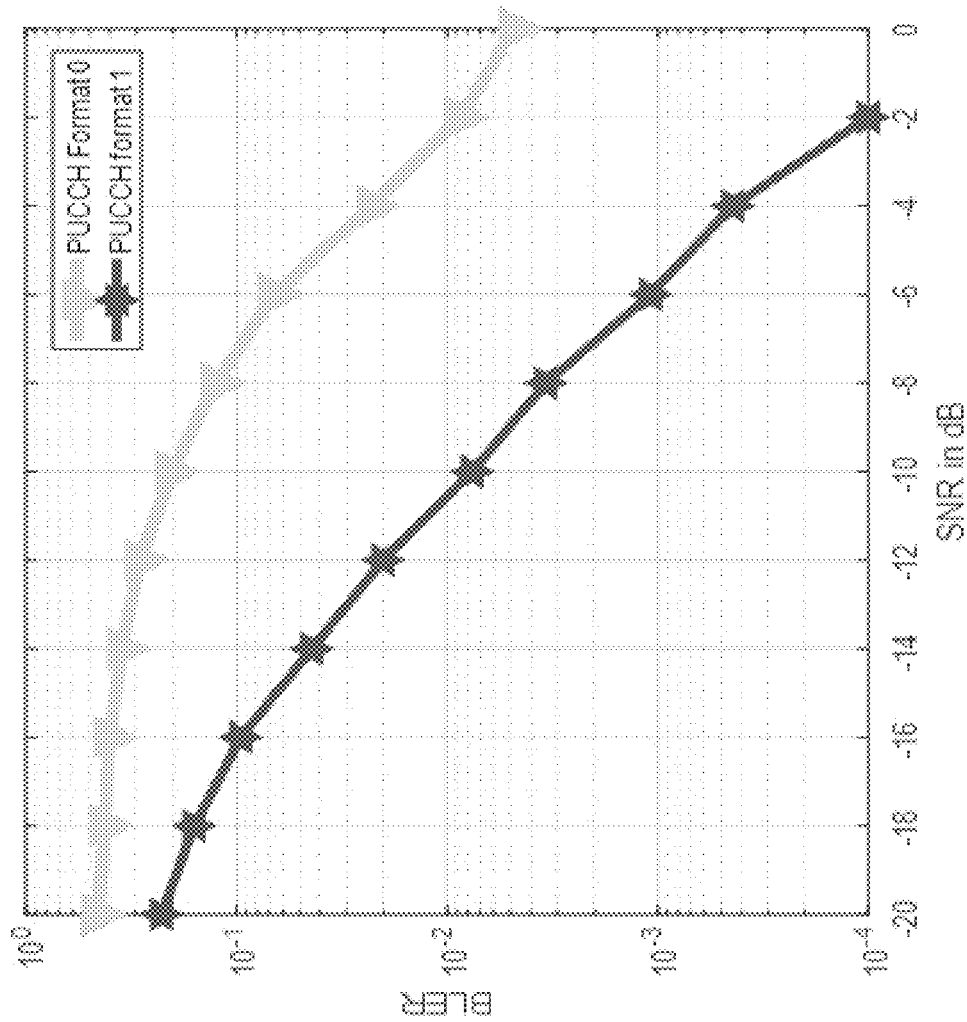
FIG. 3 illustrates is an example graph of a block error rate plot for PUCCH formats according to one or more embodiments.

Referring now to FIG. 3, illustrated is a graph of a block error rate (BLER) plot for PUCCH formats. FIG. 3 depicts the BLER plots for PUCCH format 0 and 1 with a conventional technique. It can be observed at the coverage at −7 dB, that the reliability of PUCCH format 0 is only 90% while PUCCH format 1 is about 99.8%. These reliabilities cannot satisfy NR URLLC applications (e.g., at 99.9999%).

Figure 4:
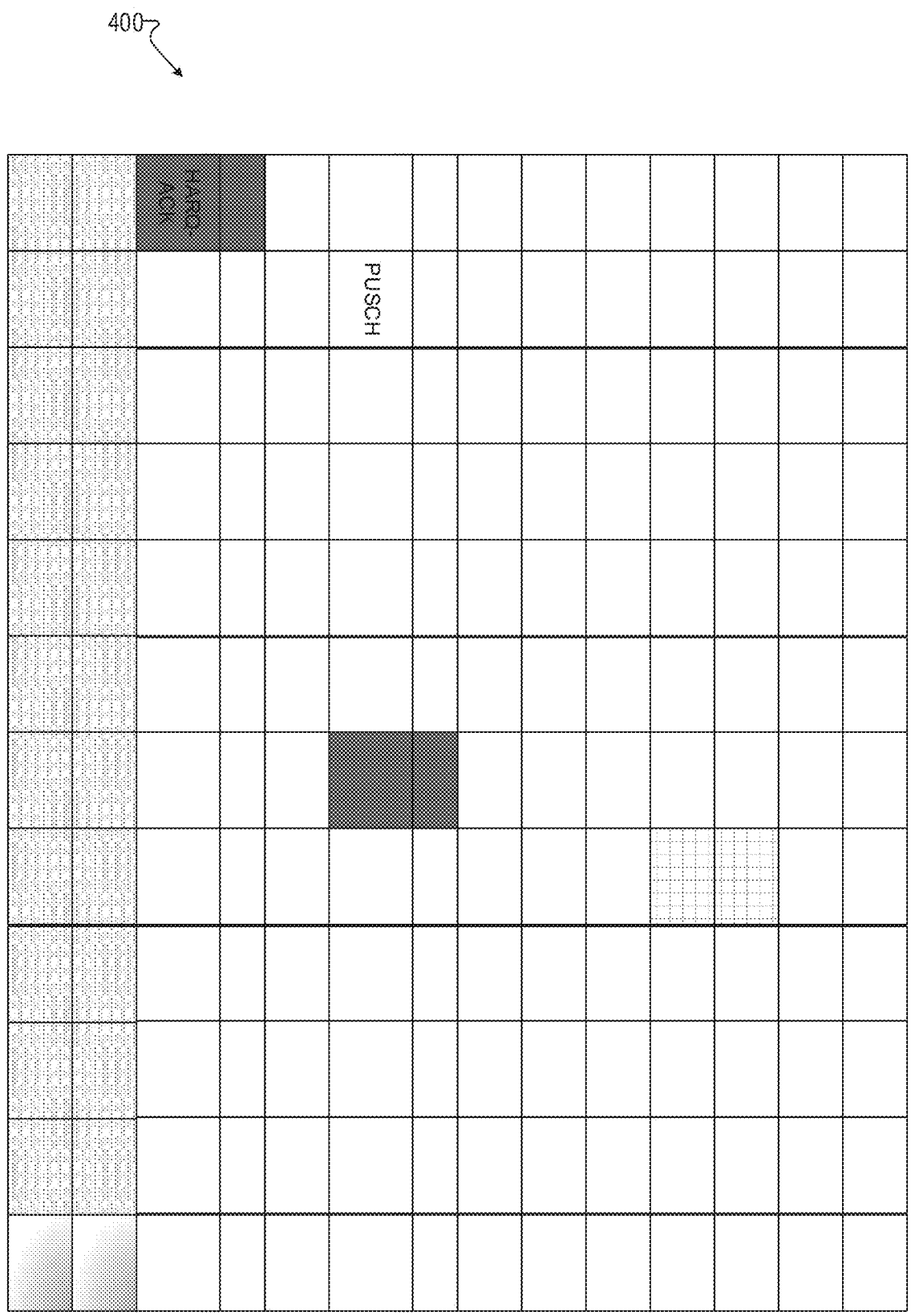
FIG. 4 illustrates an example schematic system block diagram of HARQ-ACK repeated over multiple PUCCH resources for PUCCH format 0 for antenna port 0 according to one or more embodiments.
Figure 5:
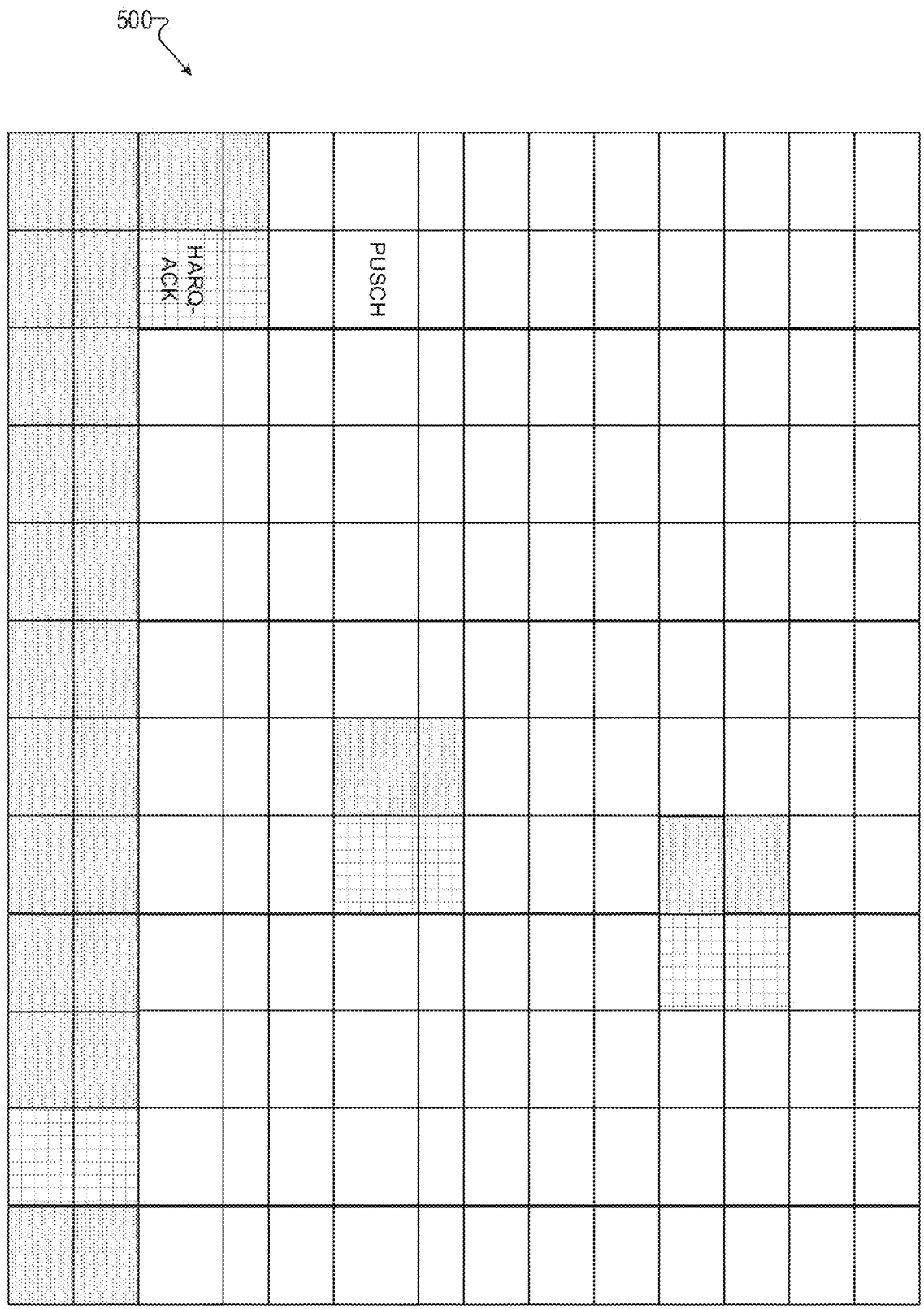
FIG. 5 illustrates an example schematic system block diagram of HARQ-ACK repeated over multiple PUCCH resources for PUCCH format 0 for antenna port 1 according to one or more embodiments.

Referring now to FIG. 4 and FIG. 5, illustrated are example schematic system block diagrams of HARQ-ACK repeated over multiple PUCCH resources according to one or more embodiments. In this case, the same information is repeated over multiple resources and multiple antenna ports as shown in FIG. 4 for PUCCH format 0 and FIG. 5 for antenna port 1.

It should be noted that in general in a MIMO system, the same resources can be used for each antenna port. However, this causes interference (inter antenna interference) and impacts the performance of the PUCCH. Hence, rather than using the same resources for each antenna port for each repeated HARQ-ACK, each antenna port can use different PUCCH resources for each HARQ-ACK on each antenna port.

In FIG. 4, it can be observed that same HARQ-ACK is repeated 4 times for PUCCH format 0 over multiple PUCCH resources. At the receiver, the network node can determine the HARQ-ACK by taking into consideration all of the PUCCH resources, thereby improving the reliability. Note that the minimum gain can be given by 10 Log(N), where N is the number of times the HARQ-ACK is repeated within a slot. Similarly, in FIG. 5, the HARQ-ACK can be repeated over multiple symbols for PUCCH format 1 for antenna port 0. In the depiction, only 2 repetitions are shown to provide gains.

Figure 6:
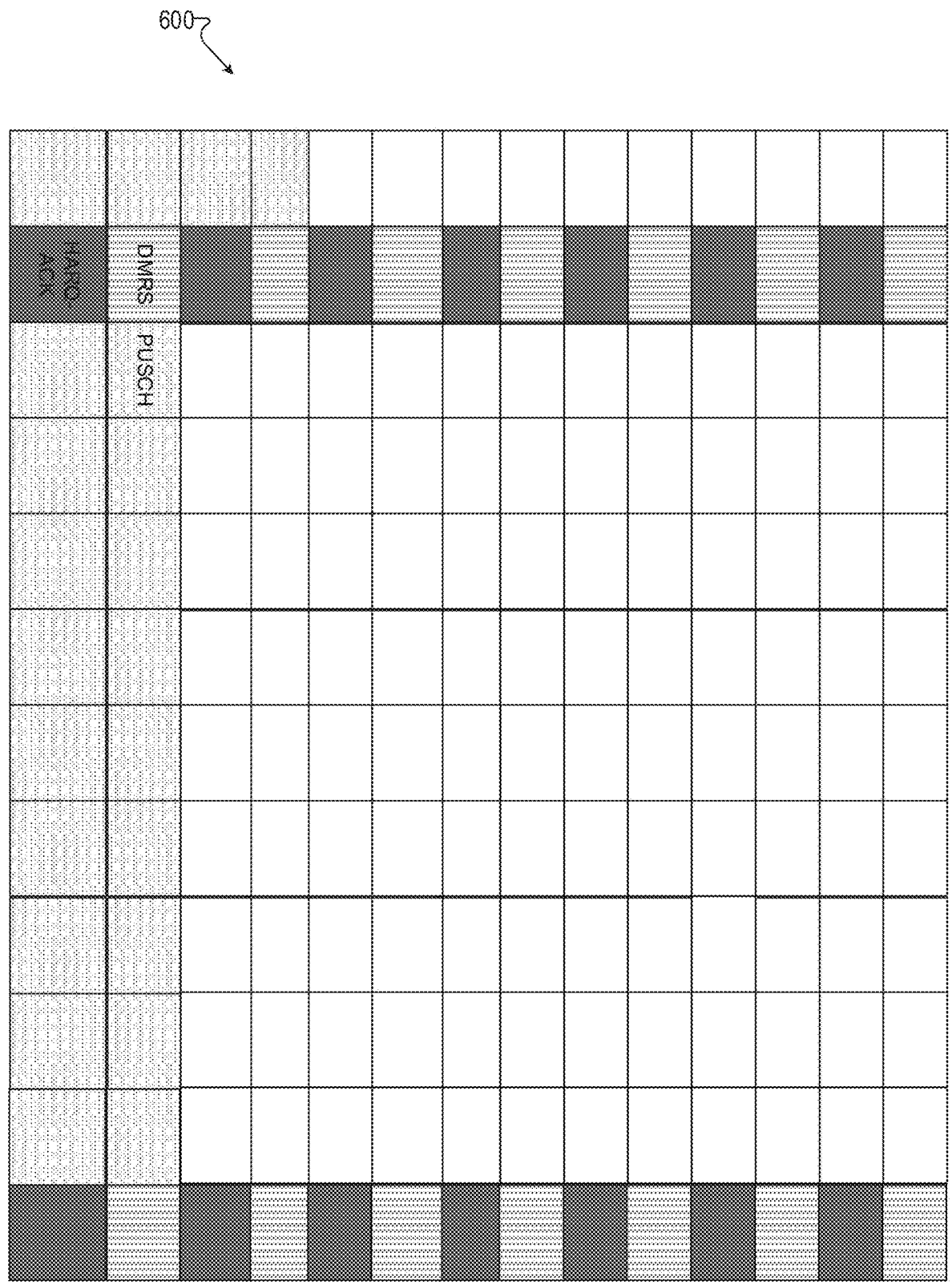
FIG. 6 illustrates an example schematic system block diagram of HARQ-ACK repeated over multiple PUCCH resources for PUCCH format 1 for antenna port 0 one or more embodiments.
Figure 7:
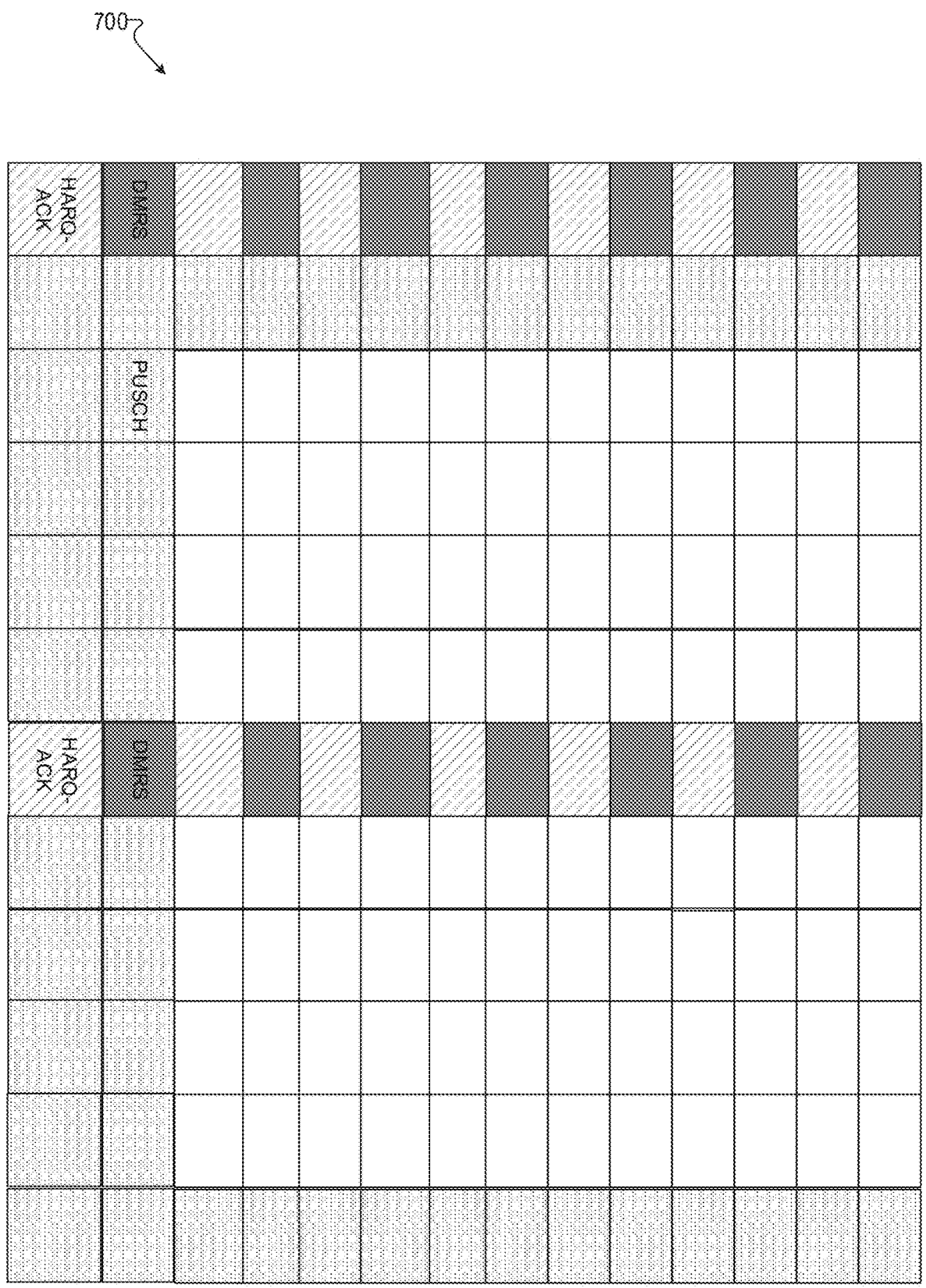
FIG. 7 illustrates an example schematic system block diagram of HARQ-ACK repeated over multiple PUCCH resources for PUCCH format 1 for antenna port 1 according to one or more embodiments.

Referring now to FIG. 6 and FIG. 7, illustrated is an example schematic system block diagram of HARQ-ACK repeated over multiple PUCCH resources for PUCCH. FIG. 6 depicts the HARQ-ACK repeated over multiple PUCCH resources for PUCCH format 1 for antenna port 0. It should be noted that different time-frequency resources can be used for each antenna port. Hence, additional diversity can be gained in addition to the HARQ-ACK gain, thereby improving the PUCCH performance. FIG. 7 depicts the HARQ-ACK repeated over multiple PUCCH resources for PUCCH format 1 for antenna port 1.

Figure 8:
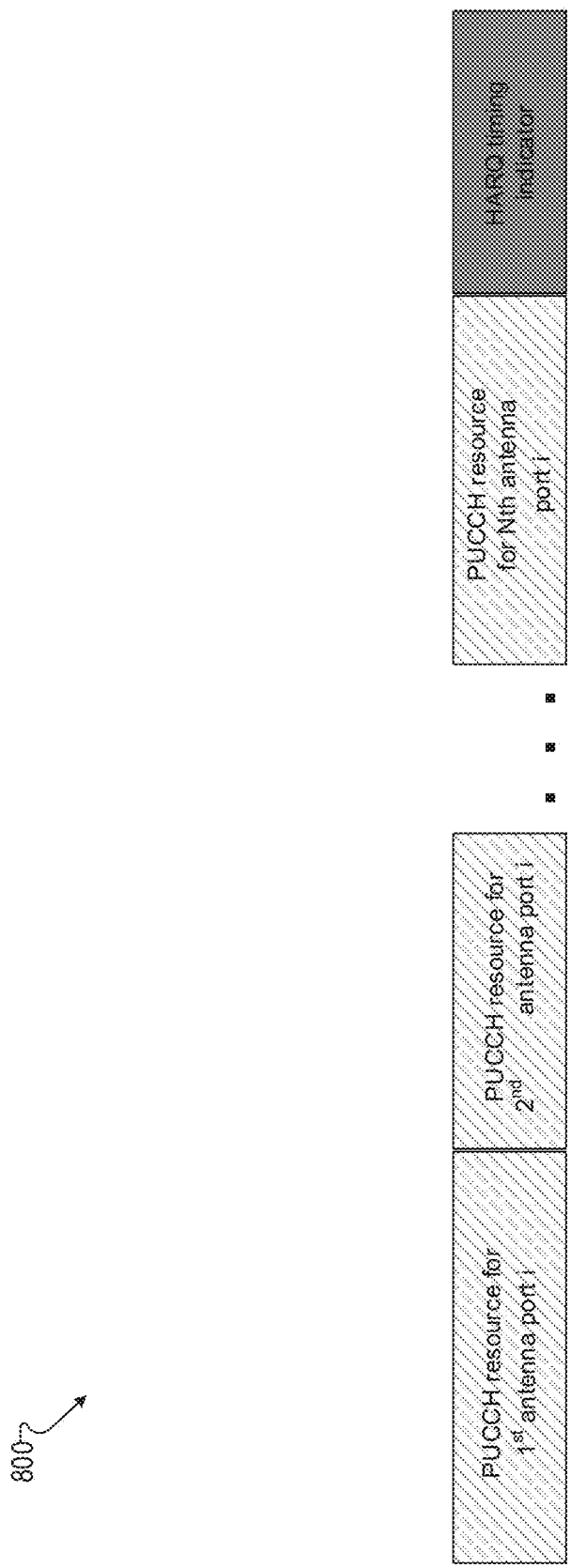
FIG. 8 illustrates an example schematic system block diagram of a proposed downlink control channel according to one or more embodiments.
Figure 9:
FIG. 9 illustrates an example schematic system block diagram of a proposed variation of the proposed downlink control channel according to one or more embodiments.

Referring now to FIG. 8 and FIG. 9, illustrated are example proposed downlink control channels according to one or more embodiments. At the time of scheduling, the network can indicate the PUCCH resources for each of the repetition HARQ-ACK in the downlink control channel 800 as depicted in FIG. 8. It should be noted that only a part of the downlink control channel is shown. However, in FIG. 9, the network can pre-define the PUCCH resources for N repetitions and configure the UE with RRC signaling. Thus, at the time of scheduling, the network can indicate the combination via the proposed downlink control channel 900 as shown in FIG. 9.

Figure 10:
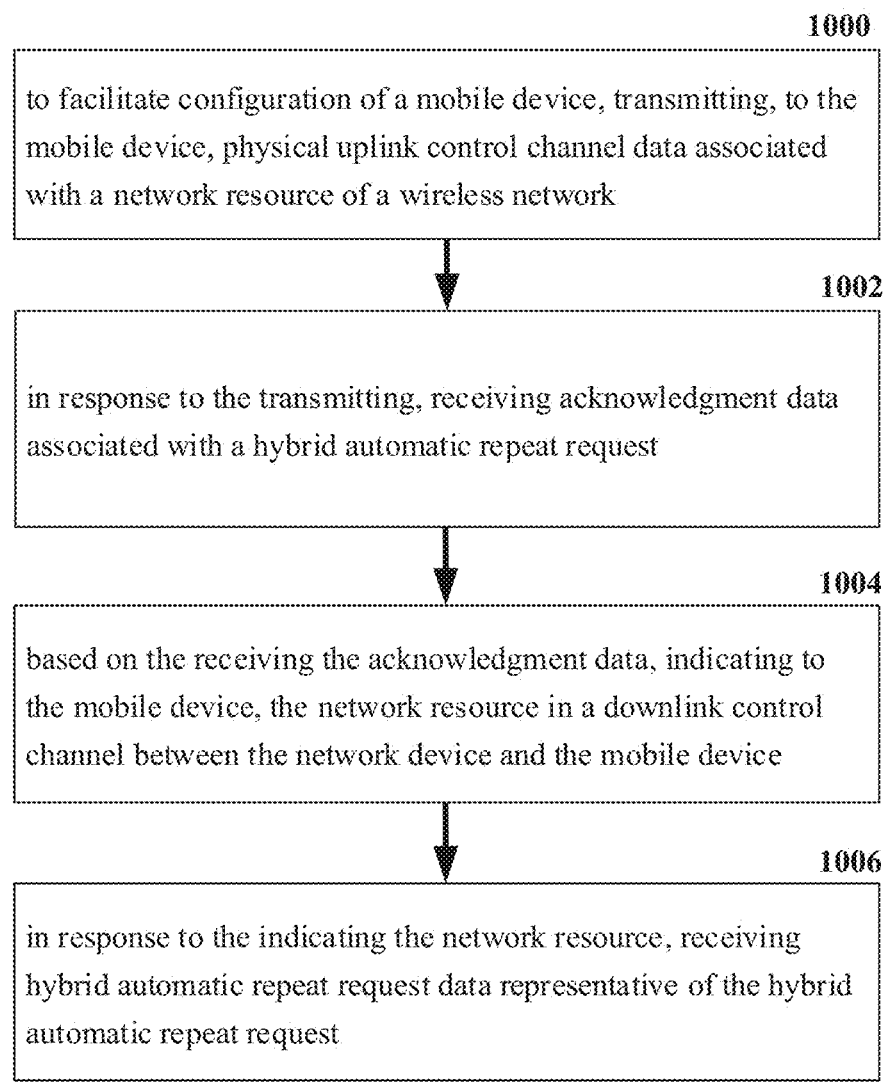
FIG. 10 illustrates an example flow diagram for a method for facilitating hybrid automatic repeat request reliability for a 5G network according to one or more embodiments.

Referring now to FIG. 10, illustrated is an example flow diagram for a method for facilitating hybrid automatic repeat request reliability for a 5G network according to one or more embodiments. At element 1000, a method can comprise transmitting to a mobile device, physical uplink control channel data associated with a network resource of a wireless network to facilitate configuration of the mobile device. At element 1002, the method can comprise receiving acknowledgment data associated with a hybrid automatic repeat request in response to the transmitting. At element 1004, the method can comprise indicating to the mobile device the network resource in a downlink control channel between the network device and the mobile device based on the receiving the acknowledgment data. Furthermore, in response to the indicating the network resource, the method can comprise receiving hybrid automatic repeat request data representative of the hybrid automatic repeat request at element 1006.

Figure 11:
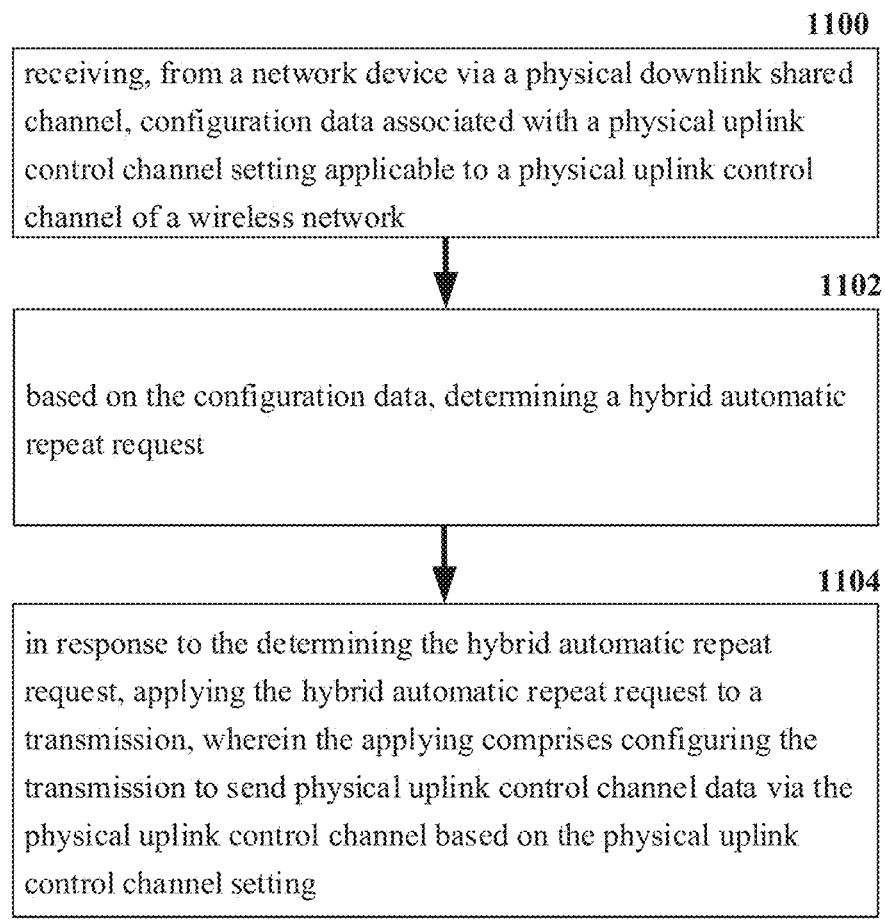
FIG. 11 illustrates an example flow diagram for a system for facilitating hybrid automatic repeat request reliability for a 5G network according to one or more embodiments.

Referring now to FIG. 11, illustrated is an example flow diagram for a system for facilitating hybrid automatic repeat request reliability for a 5G network according to one or more embodiments. At element 1100, the system can comprise receiving, from a network device via a physical downlink shared channel, configuration data associated with a physical uplink control channel setting applicable to a physical uplink control channel of a wireless network. At element 1102, the system can comprise determining a hybrid automatic repeat request based on the configuration data. Furthermore, in response to the determining the hybrid automatic repeat request, the system can comprise applying the hybrid automatic repeat request to a transmission, wherein the applying comprises configuring the transmission to send physical uplink control channel data via the physical uplink control channel based on the physical uplink control channel setting at element 1104.

Figure 12:
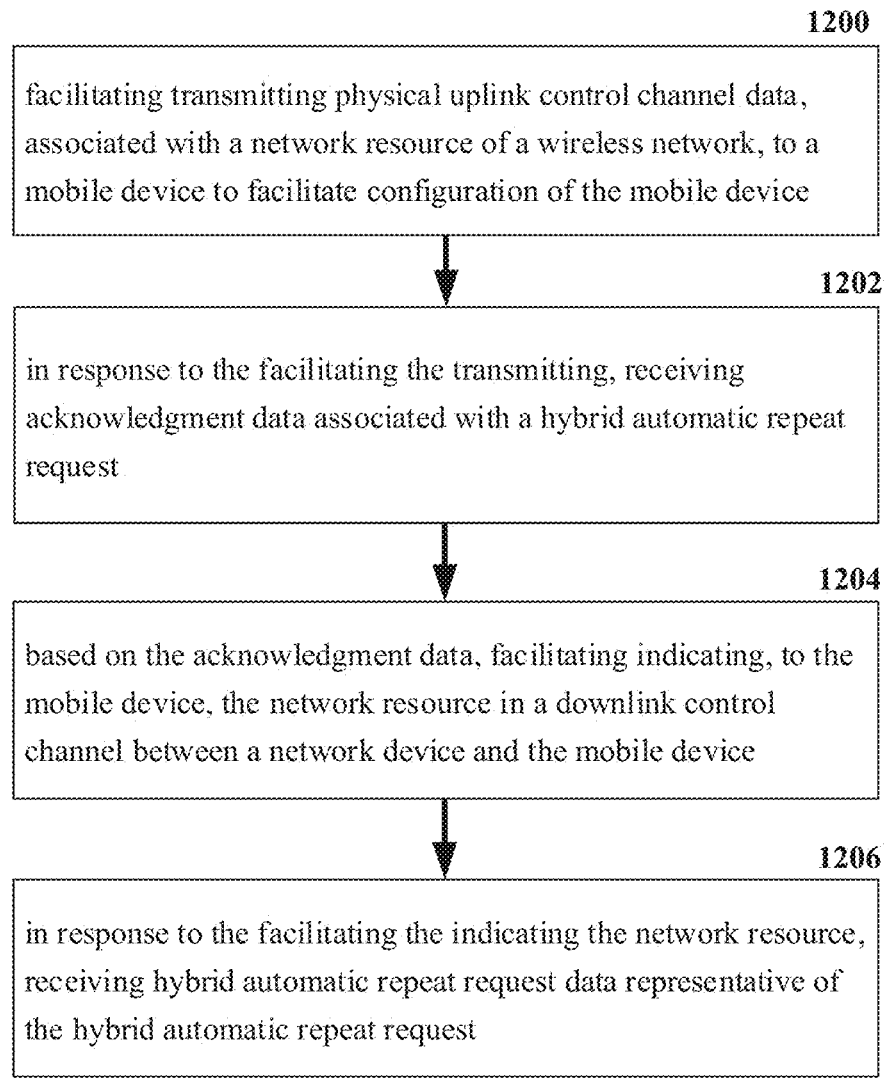
FIG. 12 illustrates an example flow diagram for a machine-readable medium for facilitating hybrid automatic repeat request reliability for a 5G network according to one or more embodiments.

Referring now to FIG. 12, illustrated is an example flow diagram for a machine-readable medium for facilitating hybrid automatic repeat request reliability for a 5G network according to one or more embodiments. At element 1200, the machine-readable storage medium can facilitate transmitting physical uplink control channel data, associated with a network resource of a wireless network, to a mobile device to facilitate configuration of the mobile device. In response to the facilitating the transmitting, at element 1202, the machine-readable storage medium can facilitate receiving acknowledgment data associated with a hybrid automatic repeat request. Based on the acknowledgment data, the machine-readable storage medium can facilitate indicating, to the mobile device, the network resource in a downlink control channel between a network device and the mobile device at element 1204. Additionally, in response to the facilitating the indicating the network resource, at element 1206, the machine-readable storage medium can facilitate receiving hybrid automatic repeat request data representative of the hybrid automatic repeat request.

Figure 13:
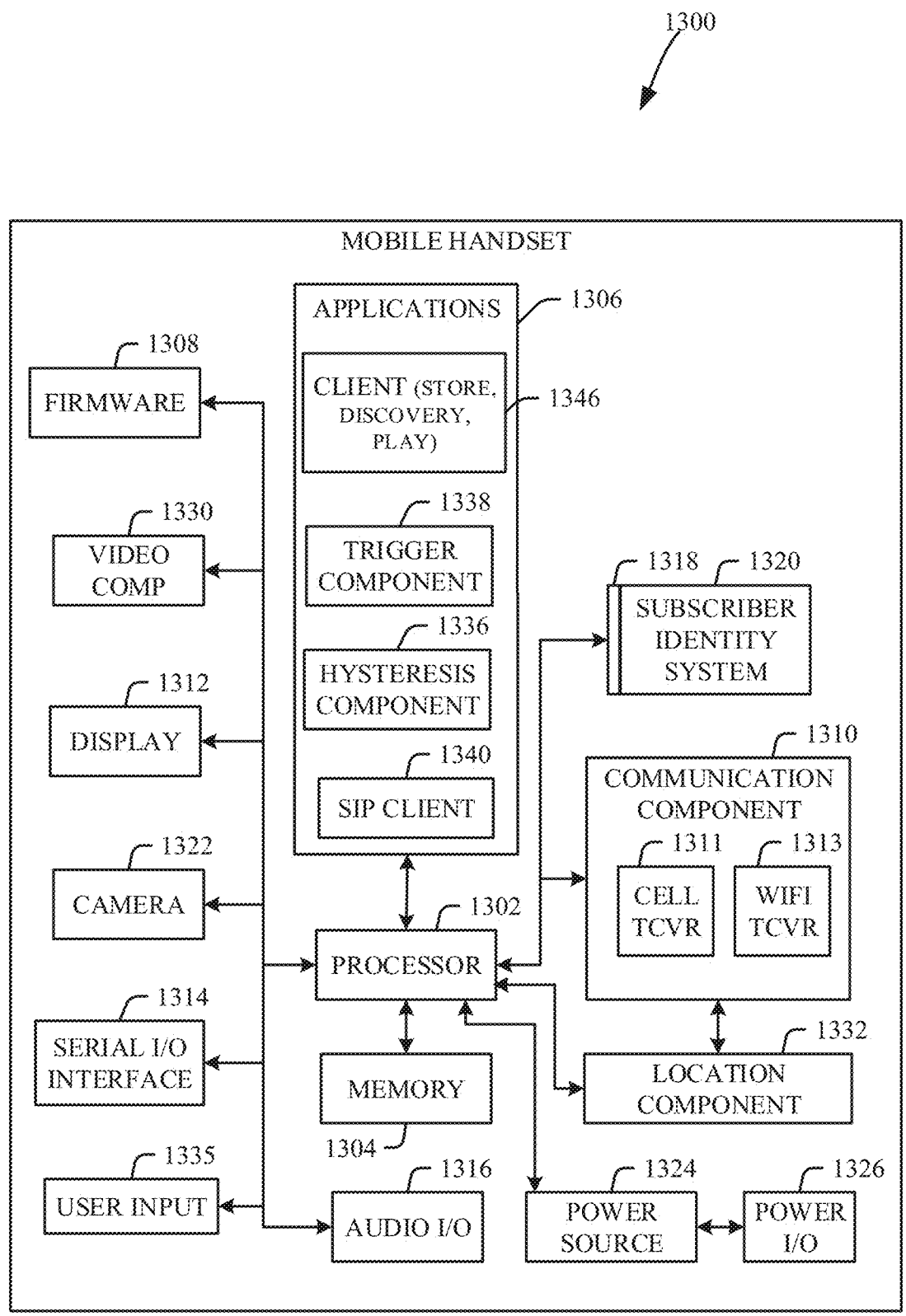
FIG. 13 illustrates an example block diagram of an example mobile handset operable to engage in a system architecture that facilitates secure wireless communication according to one or more embodiments described herein.

Referring now to FIG. 13, illustrated is an example block diagram of an example mobile handset 1300 operable to engage in a system architecture that facilitates wireless communications according to one or more embodiments described herein. Although a mobile handset is illustrated herein, it will be understood that other devices can be a mobile device, and that the mobile handset is merely illustrated to provide context for the embodiments of the various embodiments described herein. The following discussion is intended to provide a brief, general description of an example of a suitable environment in which the various embodiments can be implemented. While the description includes a general context of computer-executable instructions embodied on a machine-readable storage medium, those skilled in the art will recognize that the innovation also can be implemented in combination with other program modules and/or as a combination of hardware and software.

Generally, applications (e.g., program modules) can include routines, programs, components, data structures, etc., that perform particular tasks or implement particular abstract data types. Moreover, those skilled in the art will appreciate that the methods described herein can be practiced with other system configurations, including single-processor or multiprocessor systems, minicomputers, mainframe computers, as well as personal computers, hand-held computing devices, microprocessor-based or programmable consumer electronics, and the like, each of which can be operatively coupled to one or more associated devices A computing device can typically include a variety of machine-readable media. Machine-readable media can be any available media that can be accessed by the computer and includes both volatile and non-volatile media, removable and non-removable media. By way of example and not limitation, computer-readable media can comprise computer storage media and communication media. Computer storage media can include volatile and/or non-volatile media, removable and/or non-removable media implemented in any method or technology for storage of information, such as computer-readable instructions, data structures, program modules, or other data. Computer storage media can include, but is not limited to, RAM, ROM, EEPROM, flash memory or other memory technology, solid state drive (SSD) or other solid-state storage technology, Compact Disk Read Only Memory (CD ROM), digital video disk (DVD), Blu-ray disk, or other optical disk storage, magnetic cassettes, magnetic tape, magnetic disk storage or other magnetic storage devices, or any other medium which can be used to store the desired information and which can be accessed by the computer. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Communication media typically embodies computer-readable instructions, data structures, program modules, or other data in a modulated data signal such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media The handset includes a processor 1302 for controlling and processing all onboard operations and functions. A memory 1304 interfaces to the processor 1302 for storage of data and one or more applications 1306 (e.g., a video player software, user feedback component software, etc.). Other applications can include voice recognition of predetermined voice commands that facilitate initiation of the user feedback signals. The applications 1306 can be stored in the memory 1304 and/or in a firmware 1308, and executed by the processor 1302 from either or both the memory 1304 or/and the firmware 1308. The firmware 1308 can also store startup code for execution in initializing the handset 1300. A communications component 1310 interfaces to the processor 1302 to facilitate wired/wireless communication with external systems, e.g., cellular networks, VoIP networks, and so on. Here, the communications component 1310 can also include a suitable cellular transceiver 1311 (e.g., a GSM transceiver) and/or an unlicensed transceiver 1313 (e.g., Wi-Fi, WiMax) for corresponding signal communications. The handset 1300 can be a device such as a cellular telephone, a PDA with mobile communications capabilities, and messaging-centric devices. The communications component 1310 also facilitates communications reception from terrestrial radio networks (e.g., broadcast), digital satellite radio networks, and Internet-based radio services networks The handset 1300 includes a display 1312 for displaying text, images, video, telephony functions (e.g., a Caller ID function), setup functions, and for user input. For example, the display 1312 can also be referred to as a "screen" that can accommodate the presentation of multimedia content (e.g., music metadata, messages, wallpaper, graphics, etc.). The display 1312 can also display videos and can facilitate the generation, editing and sharing of video quotes. A serial I/O interface 1314 is provided in communication with the processor 1302 to facilitate wired and/or wireless serial communications (e.g., USB, and/or IEEE 1394) through a hardwire connection, and other serial input devices (e.g., a keyboard, keypad, and mouse). This supports updating and troubleshooting the handset 1300, for example. Audio capabilities are provided with an audio I/O component 1316, which can include a speaker for the output of audio signals related to, for example, indication that the user pressed the proper key or key combination to initiate the user feedback signal. The audio I/O component 1316 also facilitates the input of audio signals through a microphone to record data and/or telephony voice data, and for inputting voice signals for telephone conversations.

The handset 1300 can include a slot interface 1318 for accommodating a SIC (Subscriber Identity Component) in the form factor of a card Subscriber Identity Module (SIM) or universal SIM 1320, and interfacing the SIM card 1320 with the processor 1302. However, it is to be appreciated that the SIM card 1320 can be manufactured into the handset 1300, and updated by downloading data and software.

The handset 1300 can process IP data traffic through the communications component 1310 to accommodate IP traffic from an IP network such as, for example, the Internet, a corporate intranet, a home network, a person area network, etc., through an ISP or broadband cable provider. Thus, VOIP traffic can be utilized by the handset 1300 and IP-based multimedia content can be received in either an encoded or a decoded format.

A video processing component 1322 (e.g., a camera) can be provided for decoding encoded multimedia content. The video processing component 1322 can aid in facilitating the generation, editing, and sharing of video quotes. The handset 1300 also includes a power source 1324 in the form of batteries and/or an AC power subsystem, which power source 1324 can interface to an external power system or charging equipment (not shown) by a power I/O component 1326.

The handset 1300 can also include a video component 1330 for processing video content received and, for recording and transmitting video content. For example, the video component 1330 can facilitate the generation, editing and sharing of video quotes. A location tracking component 1332 facilitates geographically locating the handset 1300. As described hereinabove, this can occur when the user initiates the feedback signal automatically or manually. A user input component 1334 facilitates the user initiating the quality feedback signal. The user input component 1334 can also facilitate the generation, editing and sharing of video quotes. The user input component 1334 can include such conventional input device technologies such as a keypad, keyboard, mouse, stylus pen, and/or touch screen, for example.

Referring again to the applications 1306, a hysteresis component 1336 facilitates the analysis and processing of hysteresis data, which is utilized to determine when to associate with the access point. A software trigger component 1338 can be provided that facilitates triggering of the hysteresis component 1336 when the Wi-Fi transceiver 1313 detects the beacon of the access point. A SIP client 1340 enables the handset 1300 to support SIP protocols and register the subscriber with the SIP registrar server. The applications 1306 can also include a client 1342 that provides at least the capability of discovery, play and store of multimedia content, for example, music.

The handset 1300, as indicated above related to the communications component 1310, includes an indoor network radio transceiver 1313 (e.g., Wi-Fi transceiver). This function supports the indoor radio link, such as IEEE 802.11, for the dual-mode GSM handset 1300. The handset 1300 can accommodate at least satellite radio services through a handset that can combine wireless voice and digital radio chipsets into a single handheld device.

Figure 14:
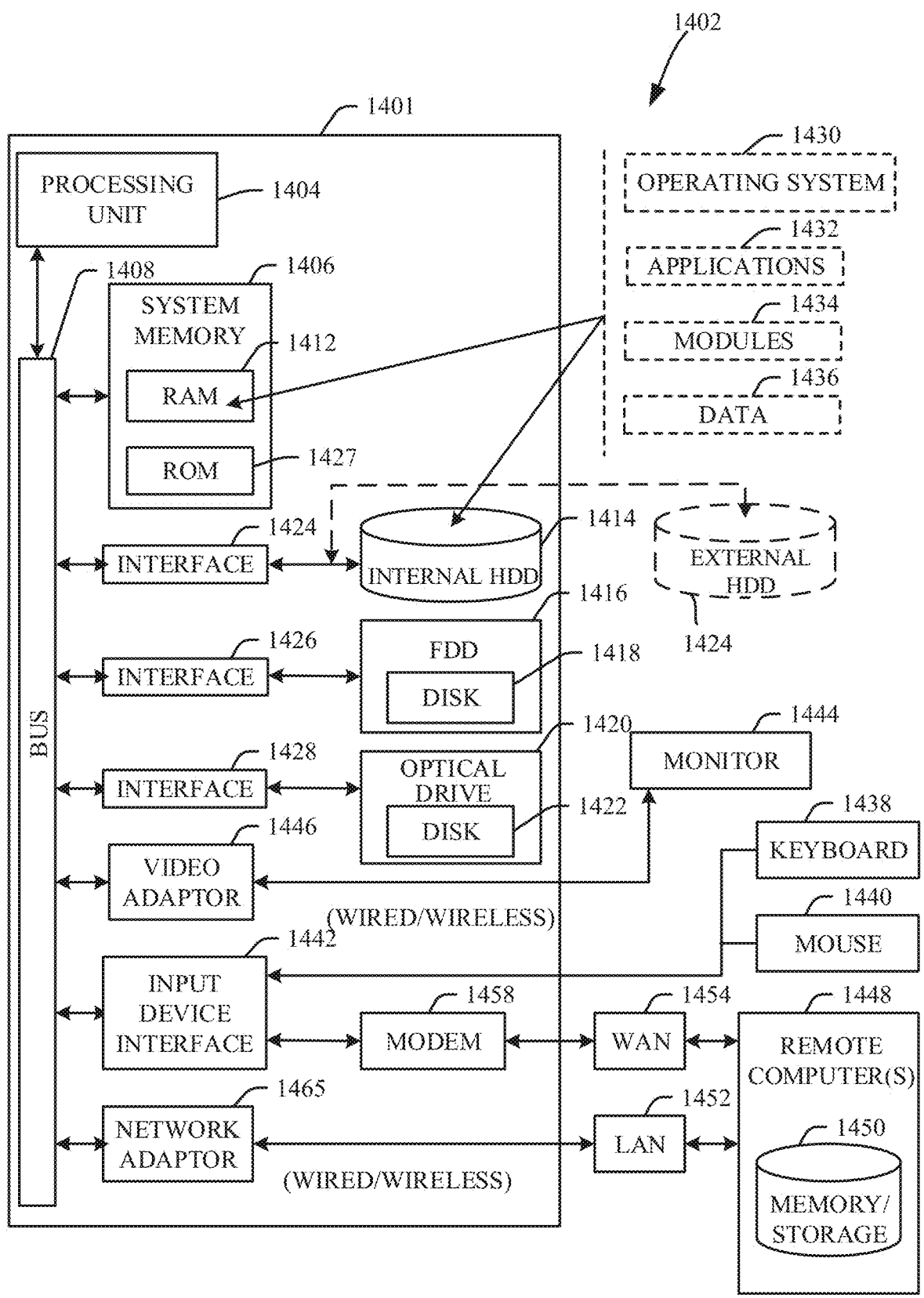
FIG. 14 illustrates an example block diagram of an example computer operable to engage in a system architecture that facilitates secure wireless communication according to one or more embodiments described herein.

Referring now to FIG. 14, illustrated is an example block diagram of an example computer 1400 operable to engage in a system architecture that facilitates wireless communications according to one or more embodiments described herein. The computer 1400 can provide networking and communication capabilities between a wired or wireless communication network and a server (e.g., Microsoft server) and/or communication device. In order to provide additional context for various aspects thereof, FIG. 14 and the following discussion are intended to provide a brief, general description of a suitable computing environment in which the various aspects of the innovation can be implemented to facilitate the establishment of a transaction between an entity and a third party. While the description above is in the general context of computer-executable instructions that can run on one or more computers, those skilled in the art will recognize that the innovation also can be implemented in combination with other program modules and/or as a combination of hardware and software.

Generally, program modules include routines, programs, components, data structures, etc., that perform particular tasks or implement particular abstract data types. Moreover, those skilled in the art will appreciate that the various methods can be practiced with other computer system configurations, including single-processor or multiprocessor computer systems, minicomputers, mainframe computers, as well as personal computers, hand-held computing devices, microprocessor-based or programmable consumer electronics, and the like, each of which can be operatively coupled to one or more associated devices.

The illustrated aspects of the innovation can also be practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media or communications media, which two terms are used herein differently from one another as follows.

Computer-readable storage media can be any available storage media that can be accessed by the computer and includes both volatile and nonvolatile media, removable and non-removable media. By way of example, and not limitation, computer-readable storage media can be implemented in connection with any method or technology for storage of information such as computer-readable instructions, program modules, structured data, or unstructured data. Computer-readable storage media can include, but are not limited to, RAM, ROM, EEPROM, flash memory or other memory technology, CD-ROM, digital versatile disk (DVD) or other optical disk storage, magnetic cassettes, magnetic tape, magnetic disk storage or other magnetic storage devices, or other tangible and/or non-transitory media which can be used to store desired information. Computer-readable storage media can be accessed by one or more local or remote computing devices, e.g., via access requests, queries or other data retrieval protocols, for a variety of operations with respect to the information stored by the medium.

Communications media can embody computer-readable instructions, data structures, program modules, or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

The techniques described herein can be applied to any device or set of devices (machines) capable of running programs and processes. It can be understood, therefore, that servers including physical and/or virtual machines, personal computers, laptops, handheld, portable and other computing devices and computing objects of all kinds including cell phones, tablet/slate computers, gaming/entertainment consoles and the like are contemplated for use in connection with various implementations including those exemplified herein. Accordingly, the general purpose computing mechanism described below with reference to FIG. 14 is but one example of a computing device.

In order to provide a context for the various aspects of the disclosed subject matter, FIG. 14 and the following discussion, are intended to provide a brief, general description of a suitable environment in which the various aspects of the disclosed subject matter can be implemented. While the subject matter has been described above in the general context of computer-executable instructions of a computer program that runs on a computer and/or computers, those skilled in the art will recognize that the disclosed subject matter also can be implemented in combination with other program modules. Generally, program modules include routines, programs, components, data structures, etc. that perform particular tasks and/or implement particular abstract data types.

In the subject specification, terms such as "store," "storage," "data store," data storage," "database," and substantially any other information storage component relevant to operation and functionality of a component, refer to "memory components," or entities embodied in a "memory" or components comprising the memory. It will be appreciated that the memory components described herein can be either volatile memory or nonvolatile memory, or can include both volatile and nonvolatile memory, by way of illustration, and not limitation, volatile memory 1420 (see below), non-volatile memory 1422 (see below), disk storage 1424 (see below), and memory storage 1446 (see below). Further, nonvolatile memory can be included in read only memory (ROM), programmable ROM (PROM), electrically programmable ROM (EPROM), electrically erasable ROM (EEPROM), or flash memory. Volatile memory can include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

Moreover, it will be noted that the disclosed subject matter can be practiced with other computer system configurations, including single-processor or multiprocessor computer systems, mini-computing devices, mainframe computers, as well as personal computers, hand-held computing devices (e.g., PDA, phone, watch, tablet computers, netbook computers, . . . ), microprocessor-based or programmable consumer or industrial electronics, and the like. The illustrated aspects can also be practiced in distributed computing environments where tasks are performed by remote processing devices that are linked through a communications network; however, some if not all aspects of the subject disclosure can be practiced on stand-alone computers. In a distributed computing environment, program modules can be located in both local and remote memory storage devices.

FIG. 14 illustrates a block diagram of a computing system 1402 operable to execute the disclosed systems and methods in accordance with an embodiment. Computer 1401, which can be, for example, part of the hardware of system 1420, includes a processing unit 1414, a system memory 1416, and a system bus 1418. System bus 1418 couples system components including, but not limited to, system memory 1416 to processing unit 1414. Processing unit 1414 can be any of various available processors. Dual microprocessors and other multiprocessor architectures also can be employed as processing unit 1414.

System bus 1418 can be any of several types of bus structure(s) including a memory bus or a memory controller, a peripheral bus or an external bus, and/or a local bus using any variety of available bus architectures including, but not limited to, Industrial Standard Architecture (ISA), Micro-Channel Architecture (MSA), Extended ISA (EISA), Intelligent Drive Electronics, VESA Local Bus (VLB), Peripheral Component Interconnect (PCI), Card Bus, Universal Serial Bus (USB), Advanced Graphics Port (AGP), Personal Computer Memory Card International Association bus (PCMCIA), Firewire (IEEE 1494), and Small Computer Systems Interface (SCSI).

System memory 1416 can include volatile memory 1420 and nonvolatile memory 1422. A basic input/output system (BIOS), containing routines to transfer information between elements within computer 1401, such as during start-up, can be stored in nonvolatile memory 1422. By way of illustration, and not limitation, nonvolatile memory 1422 can include ROM, PROM, EPROM, EEPROM, or flash memory. Volatile memory 1420 includes RAM, which acts as external cache memory. By way of illustration and not limitation, RAM is available in many forms such as SRAM, dynamic RAM (DRAM), synchronous DRAM (SDRAM), double data rate SDRAM (DDR SDRAM), enhanced SDRAM (ESDRAM), Synchlink DRAM (SLDRAM), Rambus direct RAM (RDRAM), direct Rambus dynamic RAM (DRDRAM), and Rambus dynamic RAM (RDRAM).

Computer 1401 can also include removable/non-removable, volatile/non-volatile computer storage media. FIG. 14 illustrates, for example, disk storage 1424. Disk storage 1424 includes, but is not limited to, devices like a magnetic disk drive, floppy disk drive, tape drive, flash memory card, or memory stick. In addition, disk storage 1424 can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 1424 to system bus 1418, a removable or non-removable interface is typically used, such as interface 1426.

Computing devices typically include a variety of media, which can include computer-readable storage media or communications media, which two terms are used herein differently from one another as follows.

Computer-readable storage media can be any available storage media that can be accessed by the computer and includes both volatile and nonvolatile media, removable and non-removable media. By way of example, and not limitation, computer-readable storage media can be implemented in connection with any method or technology for storage of information such as computer-readable instructions, program modules, structured data, or unstructured data. Computer-readable storage media can include, but are not limited to, random access memory (RAM), read only memory (ROM), electrically erasable programmable read only memory (EEPROM), flash memory or other memory technology, solid state drive (SSD) or other solid-state storage technology, compact disk read only memory (CD ROM), digital versatile disk (DVD), Blu-ray disc or other optical disk storage, magnetic cassettes, magnetic tape, magnetic disk storage or other magnetic storage devices or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se. In an aspect, tangible media can include non-transitory media wherein the term "non-transitory" herein as may be applied to storage, memory or computer-readable media, is to be understood to exclude only propagating transitory signals per se as a modifier and does not relinquish coverage of all standard storage, memory or computer-readable media that are not only propagating transitory signals per se. For the avoidance of doubt, the term "computer-readable storage device" is used and defined herein to exclude transitory media. Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

It can be noted that FIG. 14 describes software that acts as an intermediary between users and computer resources described in suitable operating environment 1400. Such software includes an operating system 1428. Operating system 1428, which can be stored on disk storage 1424, acts to control and allocate resources of computer system 1402. System applications 1430 take advantage of the management of resources by operating system 1428 through program modules 1432 and program data 1434 stored either in system memory 1416 or on disk storage 1424. It is to be noted that the disclosed subject matter can be implemented with various operating systems or combinations of operating systems.

A user can enter commands or information into computer 1401 through input device(s) 1436. As an example, a mobile device and/or portable device can include a user interface embodied in a touch sensitive display panel allowing a user to interact with computer 1401. Input devices 1436 include, but are not limited to, a pointing device such as a mouse, trackball, stylus, touch pad, keyboard, microphone, joystick, game pad, satellite dish, scanner, TV tuner card, digital camera, digital video camera, web camera, cell phone, smartphone, tablet computer, etc. These and other input devices connect to processing unit 1414 through system bus 1418 by way of interface port(s) 1438. Interface port(s) 1438 include, for example, a serial port, a parallel port, a game port, a universal serial bus (USB), an infrared port, a Bluetooth port, an IP port, or a logical port associated with a wireless service, etc. Output device(s) 1440 and a move use some of the same type of ports as input device(s) 1436.

Thus, for example, a USB port can be used to provide input to computer 1401 and to output information from computer 1401 to an output device 1440. Output adapter 1442 is provided to illustrate that there are some output devices 1440 like monitors, speakers, and printers, among other output devices 1440, which use special adapters. Output adapters 1442 include, by way of illustration and not limitation, video and sound cards that provide means of connection between output device 1440 and system bus 1418. It should be noted that other devices and/or systems of devices provide both input and output capabilities such as remote computer(s) 1444.

Computer 1401 can operate in a networked environment using logical connections to one or more remote computers, such as remote computer(s) 1444. Remote computer(s) 1444 can be a personal computer, a server, a router, a network PC, cloud storage, cloud service, a workstation, a microprocessor based appliance, a peer device, or other common network node and the like, and typically includes many or all of the elements described relative to computer 1401.

For purposes of brevity, only a memory storage device 1446 is illustrated with remote computer(s) 1444. Remote computer(s) 1444 is logically connected to computer 1401 through a network interface 1448 and then physically connected by way of communication connection 1450. Network interface 1448 encompasses wire and/or wireless communication networks such as local-area networks (LAN) and wide-area networks (WAN). LAN technologies include Fiber Distributed Data Interface (FDDI), Copper Distributed Data Interface (CDDI), Ethernet, Token Ring and the like. WAN technologies include, but are not limited to, point-to-point links, circuit-switching networks like Integrated Services Digital Networks (ISDN) and variations thereon, packet switching networks, and Digital Subscriber Lines (DSL). As noted below, wireless technologies may be used in addition to or in place of the foregoing.

Communication connection(s) 1450 refer(s) to hardware/software employed to connect network interface 1448 to bus 1418. While communication connection 1450 is shown for illustrative clarity inside computer 1401, it can also be external to computer 1401. The hardware/software for connection to network interface 1448 can include, for example, internal and external technologies such as modems, including regular telephone grade modems, cable modems and DSL modems, ISDN adapters, and Ethernet cards.

The above description of illustrated embodiments of the subject disclosure, including what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as those skilled in the relevant art can recognize.

In this regard, while the disclosed subject matter has been described in connection with various embodiments and corresponding Figures, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

As it employed in the subject specification, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Processors can exploit nano-scale architectures such as, but not limited to, molecular and quantum-dot based transistors, switches and gates, in order to optimize space usage or enhance performance of user equipment. A processor may also be implemented as a combination of computing processing units.

In the subject specification, terms such as "store," "storage," "data store," data storage," "database," and substantially any other information storage component relevant to operation and functionality of a component, refer to "memory components," or entities embodied in a "memory" or components comprising the memory. It will be appreciated that the memory components described herein can be either volatile memory or nonvolatile memory, or can include both volatile and nonvolatile memory.

As used in this application, the terms "component," "system." "platform," "layer," "selector," "interface," and the like are intended to refer to a computer-related entity or an entity related to an operational apparatus with one or more specific functionalities, wherein the entity can be either hardware, a combination of hardware and software, software, or software in execution. As an example, a component may be, but is not limited to being, a process running on a processor, a processor, an object, an executable, a thread of execution, a program, and/or a computer. By way of illustration and not limitation, both an application running on a server and the server can be a component. One or more components may reside within a process and/or thread of execution and a component may be localized on one computer and/or distributed between two or more computers. In addition, these components can execute from various computer readable media, device readable storage devices, or machine readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor, wherein the processor can be internal or external to the apparatus and executes at least a part of the software or firmware application. As yet another example, a component can be an apparatus that provides specific functionality through electronic components without mechanical parts, the electronic components can include a processor therein to execute software or firmware that confers at least in part the functionality of the electronic components.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Moreover, articles "a" and "an" as used in the subject specification and annexed drawings should generally be construed to mean "one or more" unless specified otherwise or clear from context to be directed to a singular form.

Moreover, terms like "user equipment (UE)," "mobile station," "mobile," subscriber station," "subscriber equipment," "access terminal," "terminal," "handset," and similar terminology, refer to a wireless device utilized by a subscriber or user of a wireless communication service to receive or convey data, control, voice, video, sound, gaming, or substantially any data-stream or signaling-stream. The foregoing terms are utilized interchangeably in the subject specification and related drawings. Likewise, the terms "access point (AP)," "base station," "NodeB," "evolved Node B (eNodeB)," "home Node B (HNB)," "home access point (HAP)," "cell device," "sector," "cell," and the like, are utilized interchangeably in the subject application, and refer to a wireless network component or appliance that serves and receives data, control, voice, video, sound, gaming, or substantially any data-stream or signaling-stream to and from a set of subscriber stations or provider enabled devices. Data and signaling streams can include packetized or frame-based flows.

Additionally, the terms "core-network", "core", "core carrier network", "carrier-side", or similar terms can refer to components of a telecommunications network that typically provides some or all of aggregation, authentication, call control and switching, charging, service invocation, or gateways. Aggregation can refer to the highest level of aggregation in a service provider network wherein the next level in the hierarchy under the core nodes is the distribution networks and then the edge networks. UEs do not normally connect directly to the core networks of a large service provider but can be routed to the core by way of a switch or radio area network. Authentication can refer to determinations regarding whether the user requesting a service from the telecom network is authorized to do so within this network or not. Call control and switching can refer determinations related to the future course of a call stream across carrier equipment based on the call signal processing. Charging can be related to the collation and processing of charging data generated by various network nodes. Two common types of charging mechanisms found in present day networks can be prepaid charging and postpaid charging. Service invocation can occur based on some explicit action (e.g. call transfer) or implicitly (e.g., call waiting). It is to be noted that service "execution" may or may not be a core network functionality as third party network/nodes may take part in actual service execution. A gateway can be present in the core network to access other networks. Gateway functionality can be dependent on the type of the interface with another network.

Furthermore, the terms "user," "subscriber," "customer," "consumer," "prosumer." "agent," and the like are employed interchangeably throughout the subject specification, unless context warrants particular distinction(s) among the terms. It should be appreciated that such terms can refer to human entities or automated components (e.g., supported through artificial intelligence, as through a capacity to make inferences based on complex mathematical formalisms), that can provide simulated vision, sound recognition and so forth.

Aspects, features, or advantages of the subject matter can be exploited in substantially any, or any, wired, broadcast, wireless telecommunication, radio technology or network, or combinations thereof. Non-limiting examples of such technologies or networks include Geocast technology; broadcast technologies (e.g., sub-Hz, ELF, VLF, LF, MF, HF, VHF, UHF, SHF, THz broadcasts, etc.); Ethernet; X.25; powerline-type networking (e.g., PowerLine AV Ethernet, etc.); femto-cell technology; Wi-Fi; Worldwide Interoperability for Microwave Access (WiMAX); Enhanced General Packet Radio Service (Enhanced GPRS); Third Generation Partnership Project (3GPP or 3G) Long Term Evolution (LTE); 3GPP Universal Mobile Telecommunications System (UMTS) or 3GPP UMTS; Third Generation Partnership Project 2 (3GPP2) Ultra Mobile Broadband (UMB); High Speed Packet Access (HSPA); High Speed Downlink Packet Access (HSDPA); High Speed Uplink Packet Access (HSUPA); GSM Enhanced Data Rates for GSM Evolution (EDGE) Radio Access Network (RAN) or GERAN; UMTS Terrestrial Radio Access Network (UTRAN); or LTE Advanced.

What has been described above includes examples of systems and methods illustrative of the disclosed subject matter. It is, of course, not possible to describe every combination of components or methods herein. One of ordinary skill in the art may recognize that many further combinations and permutations of the disclosure are possible. Furthermore, to the extent that the terms "includes," "has," "possesses," and the like are used in the detailed description, claims, appendices and drawings such terms are intended to be inclusive in a manner similar to the term "comprising" as "comprising" is interpreted when employed as a transitional word in a claim.

While the various embodiments are susceptible to various modifications and alternative constructions, certain illustrated implementations thereof are shown in the drawings and have been described above in detail. It should be understood, however, that there is no intention to limit the various embodiments to the specific forms disclosed, but on the contrary, the intention is to cover all modifications, alternative constructions, and equivalents falling within the spirit and scope of the various embodiments.

In addition to the various implementations described herein, it is to be understood that other similar implementations can be used or modifications and additions can be made to the described implementation(s) for performing the same or equivalent function of the corresponding implementation(s) without deviating therefrom. Still further, multiple processing chips or multiple devices can share the performance of one or more functions described herein, and similarly, storage can be effected across a plurality of devices. Accordingly, the various embodiment are not to be limited to any single implementation, but rather are to be construed in breadth, spirit and scope in accordance with the appended claims.

What is claimed is:

1. A method, comprising:
   transmitting, by a network equipment comprising a processor, application data to a user equipment;
   receiving, by the network equipment, capability data representative of a capability of the user equipment, wherein the capability data comprises antenna port data representative of a number of antenna ports associated with the user equipment;
   in response to receiving of the antenna port data, configuring, by the network equipment, the user equipment with the number of antenna ports for physical uplink control channel transmission;
   transmitting, by the network equipment to the user equipment, repetition data representative of a number of repetitions of hybrid automatic repeat requests, wherein the number of repetitions is equal to the number of the antenna ports;
   in response to transmitting the repetition data and in accordance with the number of repetitions, receiving, by the network equipment, first acknowledgment data for the application data associated with a first hybrid automatic repeat request, of the hybrid automatic repeat requests, via a first frequency resource;
   based on receiving the first acknowledgment data, indicating, by the network equipment to the user equipment, a second frequency resource in a downlink control channel between the network equipment and the user equipment; and
   in response to indicating the second frequency resource, receiving, by the network equipment, second acknowledgment data for the application data associated with a second hybrid automatic repeat request via the second frequency resource associated with an antenna port of the user equipment;
   aggregating the first acknowledgement data and the second acknowledgement data resulting in aggregated acknowledgement data; and
   determining whether the application data was successfully received by the user equipment based on the aggregated acknowledgment data.

2. The method of claim 1, wherein indicating a network resource in the downlink control channel comprises associating the network resource with the antenna port of the user equipment.

3. The method of claim 1, wherein the antenna port is a first antenna port, and further comprising:
   receiving, by the network equipment, hybrid automatic repeat request data associated with a second antenna port of the user equipment.

4. The method of claim 1, further comprising:
   receiving, by the network equipment, hybrid automatic repeat request data using a network resource associated with a physical uplink control channel data.

5. The method of claim 1, further comprising:
   combining, by the network equipment, first hybrid automatic repeat request data and second hybrid automatic repeat request data, resulting in aggregated hybrid automatic repeat request data.

6. The method of claim 1, further comprising:
   aggregating, by the network equipment, first hybrid automatic repeat request data and second hybrid automatic repeat request data wherein aggregating the first hybrid automatic repeat request data and the second hybrid automatic repeat request data increases a performance metric associated with a performance of a physical uplink control channel.

7. The method of claim 1, wherein the number of repetitions is associated with a slot of the antenna port.

8. A system, comprising:
   a processing system including a processor; and
   a memory that stores executable instructions that, when executed by the processor, facilitate performance of operations, comprising:
   receiving application data from network equipment;
   sending capability data representative of a capability of the user equipment to the network equipment, wherein the capability data comprises antenna port data representative of a number of antenna ports associated with the user equipment;
   in response to sending of the antenna port data, configuring the user equipment with the number of antenna ports for physical uplink control channel transmission;
   based on configuration data associated with a physical uplink control channel setting applicable to a physical uplink control channel enabled via a network, determining a first hybrid automatic repeat request, wherein the configuration data comprises repetition data representative of a number of repetitions of hybrid automatic repeat requests, wherein the number of repetitions is equal to the number of the antenna ports;
   in response to determining the first hybrid automatic repeat request, applying the first hybrid automatic repeat request to a first transmission for the application data, wherein the applying comprises configuring the first transmission to send physical uplink control channel data via the physical uplink control channel based on the physical uplink control channel setting and in conjunction with a first frequency resource;
   in response to applying the first hybrid automatic repeat request to the first transmission, receiving an indication of a second frequency resource from the network equipment; and
   in response to receiving the indication, applying a second hybrid automatic repeat request to a second transmission for the application data in accordance with the second frequency resource and the repetition data, wherein the network equipment aggregates the first hybrid automatic repeat request and the second hybrid automatic repeat request resulting in first aggregated hybrid automatic repeat request data, wherein the network equipment determines whether the application data was successfully received by the user equipment based on the aggregated hybrid automatic repeat request data.

9. The system of claim 8, wherein configuring the first transmission comprises configuring the physical uplink control channel data via antennas of the user equipment of the network.

10. The system of claim 8, wherein configuring the first transmission comprises configuring the physical uplink control channel data to use a specified network resource via the network.

11. The system of claim 8, wherein the operations further comprise:
    indicating that a specified network resource is associated with an antenna port of the user equipment.

12. The system of claim 8, wherein the operations further comprise:
    generating second aggregated hybrid automatic repeat request data, wherein the second aggregated hybrid automatic repeat request data comprises first hybrid automatic repeat request data and second hybrid automatic repeat request data.

13. The system of claim 8, wherein the operations further comprise:
    receiving, from the network equipment via a physical downlink shared channel, the configuration data associated with the physical uplink control channel setting applicable to the physical uplink control channel enabled via the network.

14. The system of claim 8, wherein the configuration data is received via a physical downlink shared channel.

15. A non-transitory machine-readable medium, comprising executable instructions that, when executed by a processor, facilitate performance of operations, comprising:
    receiving application data from a network equipment;
    sending capability data representative of a capability of user equipment to the network equipment, wherein the capability data comprises antenna port data representative of a number of antenna ports associated with the user equipment;
    in response to sending of the antenna port data, configuring the user equipment with the number of antenna ports for the physical uplink control channel transmission;
    transmitting repetition data representative of a number of repetitions applicable to hybrid automatic repeat requests, wherein the number of repetitions is equal to the number of the antenna ports;
    in response to transmitting the repetition data, receiving first acknowledgment data for the application data associated with a first hybrid automatic repeat request via a first frequency resource;
    based on the first acknowledgment data, indicating, to a mobile device, a second frequency resource in a downlink control channel between the network equipment and the mobile device; and
    in response to indicating the second frequency resource and in accordance with the repetition data, receiving second acknowledgement data, representative of a second hybrid automatic repeat request, via the second frequency resource, wherein the network equipment aggregates the first acknowledgement data and second acknowledgement data resulting in aggregated acknowledgement data, wherein the network equipment determines whether the application data was successfully received by the mobile device based on the aggregated acknowledgement data.

16. The non-transitory machine-readable medium of claim 15, wherein indicating the second frequency resource is based on an antenna port of the mobile device.

17. The non-transitory machine-readable medium of claim 15, wherein the operations further comprise:
    transmitting, by the mobile device, physical uplink control channel data associated with the second frequency resource.

18. The non-transitory machine-readable medium of claim 15, wherein the transmitting the repetition data is based on the number of antenna ports of the mobile device.

19. The non-transitory machine-readable medium of claim 15, wherein the second frequency resource is associated with a first antenna of the mobile device, and wherein indicating the second frequency resource comprises is associated with a second antenna of the mobile device.

20. The non-transitory machine-readable medium of claim 15, wherein operations further comprise:
    aggregating the first hybrid automatic repeat request and the second hybrid automatic repeat request to increase a performance parameter of a physical uplink control channel associated with physical uplink control channel data.

* * * * *